(12) United States Patent
Kuehner et al.

(10) Patent No.: US 10,642,838 B2
(45) Date of Patent: May 5, 2020

(54) REAL-TIME OR EVENT-BASED ANALYSIS OF PROCESS DATA

(71) Applicant: SAP SE, Walldorf (DE)

(72) Inventors: Ralf Kuehner, Otterberg (DE); Udo Laub, Hambruecken (DE)

(73) Assignee: SAP SE, Walldorf (DE)

( * ) Notice: Subject to any disclaimer, the term of this patent is extended or adjusted under 35 U.S.C. 154(b) by 239 days.

(21) Appl. No.: 15/718,918

(22) Filed: Sep. 28, 2017

(65) Prior Publication Data

US 2019/0095492 A1    Mar. 28, 2019

(51) Int. Cl.
| | |
|---|---|
| G06F 16/2455 | (2019.01) |
| G06F 16/248 | (2019.01) |
| G06F 16/28 | (2019.01) |
| G06F 16/25 | (2019.01) |
| G06Q 10/06 | (2012.01) |

(52) U.S. Cl.
CPC ...... *G06F 16/24553* (2019.01); *G06F 16/248* (2019.01); *G06F 16/25* (2019.01); *G06F 16/282* (2019.01); *G06Q 10/063* (2013.01)

(58) Field of Classification Search
CPC combination set(s) only.
See application file for complete search history.

(56) References Cited

U.S. PATENT DOCUMENTS

| | | | |
|---|---|---|---|
| 9,792,160 B2 * | 10/2017 | Shear | G06F 17/20 |
| 2005/0119951 A1 | 6/2005 | Laub et al. | |
| 2005/0131947 A1 | 6/2005 | Laub et al. | |
| 2005/0234980 A1 | 10/2005 | Birkenhauer et al. | |
| 2006/0085294 A1 | 4/2006 | Boerner et al. | |
| 2006/0230160 A1 | 10/2006 | Dinkel et al. | |
| 2007/0233541 A1 | 10/2007 | Schorr et al. | |
| 2010/0198779 A1 | 8/2010 | Laub et al. | |
| 2011/0040715 A1 | 2/2011 | Dinkel et al. | |
| 2012/0116564 A1 | 5/2012 | Dinkel et al. | |
| 2013/0159149 A1 | 6/2013 | Schachner et al. | |
| 2015/0379426 A1 * | 12/2015 | Steele | G06N 20/00 706/12 |

(Continued)

OTHER PUBLICATIONS

"CKIS SAP Items Unit Costing/Itemization Product Costing Table" retrieved from http://www.se80.co.uk/saptables/c/ckis/ckis.htm on or before Sep. 2017, 7 pages.

(Continued)

*Primary Examiner* — Shyue Jiunn Hwa
(74) *Attorney, Agent, or Firm* — Klarquist Sparkman, LLP

(57) ABSTRACT

Technologies are described for acquiring and processing data related to a production process, including to generate a report of variances between planned values and actual values. Data can be received from a plurality of data sources, such as hardware sensors, associated with the production process. The data can be sent in real time, such as in response to a request or upon the occurrence of a particular event. The data can be received and stored in one or more database tables having a format. The format can be the same format as a format in which planning data is maintained. When maintained in a common format, comparisons of planning and actual data can be carried out faster and with less processor use. Reports can include granular data, such as variances associated with particular data sources, or groups of data sources.

20 Claims, 15 Drawing Sheets

(56) References Cited

U.S. PATENT DOCUMENTS

| | | | |
|---|---|---|---|
| 2018/0181144 A1* | 6/2018 | Steinmann | G06Q 30/0283 |
| 2019/0050321 A1* | 2/2019 | Sapozhnikov | G06F 8/00 |

OTHER PUBLICATIONS

"Double Entry Accounting Bookkeeping System" retrieved from https://www.business-case-analysis.com/double-entry-system.html.

"S/4 and SAP's Cloud Platform" retrieved from www.acdoca.com on or before Sep. 2017, 9 pages.

Salmon, J., Controlling with SAP—Practical Guide, "Introduction" retrieved from http://www.beck-shop.de/fachbuch/leseprobe/9781592293926_Excerpt_001.pdf on or before Sep. 2017, 51 pages.

"SAP HANA—Introduction" retrieved from https://www.tutorialspoint.com/sap_simple_finance/sap_simple_finance_quick_guide.htm on or before Sep. 2017, 77 pages.

"SAP Integration—FICO" retrieved from https://quizlet.com/150416125/sap-integration-fico-flash-cards/ on or before Sep. 2017, 7 pages.

"SAP Library Production Orders" retrieved from https://help.sap.com/saphelp_erp60_sp/helpdata/en/f5/03b753128eb44ce10000000a174cb4/frameset.htm on or before Sep. 2017, 1 page.

"SAP Library Cost Object Controlling" retrieved from https://help.sap.com/saphelp_erp60_sp/helpdata/en/09/c8d8530439414de10000000a174cb4/frameset.htm on or before Sep. 2017, 4 pages.

"SAP Library Material Requirements Planning", retrieved from https://help.sap.com/erp2005_ehp_05/helpdata/EN/global/banner.htm on or before Sep. 2017, 5 pages.

"SAP Library Product Cost Collector" retrieved from https://help.sap.com/saphelp_erp60_sp/helpdata/en/0b/ac39531d37e447e10000000a441470/frameset.htm on or before Sep. 2017, 6 pages.

"SAP Library Repetitive Manufacturing" retrieved from https://help.sap.com/saphelp_erp60_sp/helpdata/en/2f/6ab6531de6b64ce10000000a174cb4/frameset.htm on or before Sep. 2017, 5 pages.

"SAP Library Rework and Confirmation" retrieved from https://help.sap.com/saphelp_erp60_sp/helpdata/en/09/05b753128eb44ce10000000a174cb4/frameset.htm on or before Sep. 2017, 1 page.

"SAP MM Master Data" retrieved from https://www.tutorialspoint.com/sap_mm/sap_mm_master_data.htm on or before Sep. 2017, 30 pages.

"Scrap" retrieved from https://www.accountingtools.com/articles/ on or before Sep. 2017, 2 pages.

"Scrap Definition" retrieved from http://www.businessdictionary.com/definition/scrap.html on or before Sep. 2017, 1 page.

"Single Entry Accounting Bookkeeping System" retrieved from https://www.business-case-analysis.com/single-entry-accounting.html on or before Sep. 2017, 7 pages.

"Statistical Key Figure" 37 minute YouTube video presentation retrieved from https://www.youtube.com/watch?v=qHCF6Gxq_uc on or before Sep. 2017, 1 page.

Surbhi, S. "Difference Between Purchase Order and Sales Order" retrieved from http://keydifferences.com/difference-between-purchase-order-and-sales-order.html on or before Sep. 2017, 10 pages.

"What is scrap value?" retrieved from https://www.accountingcoach.com/blog/what-is-scrap-value on or before Sep. 2017, 3 pages.

"Wip calculation in production order" retrieved from https://archive.sap.com/discussions/thread/1163165 on or before Sep. 2017, 2 pages.

"Work Center in SAP PP: Create, Change, Display" retrieved from https://www.guru99.com/work-center-sap-pp.html on or before Sep. 2017, 13 pages.

"Double Entry Accounting Bookkeeping System" retrieved from https://www.business-case-analysis.com/double-entry-system.html on or before Sep. 2017, 15 pages.

"Double-entry bookkeeping system" retrieved from https://en.wikipedia.org/wiki/Double-entry_bookkeeping_system on or before Sep. 2017, 15 pages.

"FIFO, LIFO, and Average Cost Method of Accounting for Inventory" retrieved from https://www.zenventory.com/fifo-lifo-average-cost-method-accounting-inventory/ on or before Sep. 2017, 3 pages.

Gummapadu, R. BIexpert. "Balance-Sheet and Cash-Flow Planning with SAP NetWeaver BI" 6:9, (Oct. 2008), retrieved from https://techwave.net/wp-content/uploads/2016/01/Balance_Sheet_Cash_Flow_Planning_Final_Techwave.pdf.

"Introducing the universal journal: excerpt from First Steps in S/4HANA Finance" retrieved from https://espressotutorials.wordpress.com/2016/12/20/introducing-the-universal-journal-excerpt-from-first-steps-in-s4hana-finance/ on or before Sep. 2017, 7 pages.

"KEKO—Product Costing—Header Data—SAP table", retrieved from http://www.tcodesearch.com/sap-tables/detail?id=KEKO on or before Sep. 2017, 5 pages.

"KEKO SAP Product Costing—Header Data Table—APAP", retrieved from http://www.se80.co.uk/saptables/k/keko/keko.htmhttp://www.se80.co.uk/saptables/k/keko/keko.htm on or before Sep. 2017, 5 pages.

"Navigation from S/4HANA Finance Report to its HANA Table" retrieved from http://pasapas-sap-support.com/content/navigation-s4hana-finance-report-its-hana-table on or before Sep. 2017, 11 pages.

Parasuramuni, S. "Discrete Manufacturing Vs Repetitive Manufacturing" retrieved from https://wiki.scn.sap.com/wiki/display/ERPLO/Discrete+Manufacturing+Vs+Repetitive+Manufacturing on or before Sep. 2017, 2 pages.

Parasuramuni, S. "ERP Production Planning—ERP Operations", retrieved from https://wiki.scn.sap.com/wiki/display/ERPLO/ERP+PP on or before Sep. 2017, 3 pages.

"S4 Hana Finance Capability and Frequently Asked Questions", retrieved from https://www.slideshare.net/capgemini/sap-s4hana-finance-capability-and-frequently-asked-questions on or before Sep. 2017, 28 pages.

"SAP Library Primary Settlement of Rework" retrieved from https://help.sap.com/saphelp_erp60_sp/helpdata/en/09/c8d8530439414de10000000a174cb4/frameset.htm on or before Sep. 2017, 1 page.

"Creation of Actual Assessment Cycle" 37 minute YouTube video presentation retrieved from https://www.youtube.com/watch?v=qHCF6Gxq_uc on or before Sep. 2017, 1 page.

* cited by examiner

604 →

| Element | Value In | Category In | Value Out | Category Out |
|---|---|---|---|---|
| Input A | 23.12 | AAVC | 23.12 | INVA |
| Input B | 65.78 | EFNB | 65.78 | INVB |
| Partial A | 234.32 | WIP | 234.32 | INVPA |
| Partial B | 732.73 | WIP | 732.73 | INVPB |
| Item | 6434.23 | ITMX | 6434.23 | INVPA |

608 →

| Category AAVC | |
|---|---|
| Input A | +21.57 |
| Input A | -10.55 |

620

612 →

| Category INVA | |
|---|---|
| Input A | -21.57 |
| Input A | +42.46 |

| Element | Value In | Category In | Value Out | Category In |
|---|---|---|---|---|
| Input A | 23.12 | AAVC | 23.12 | AAVC |
| Input B | 65.78 | EFNB | 65.78 | EFNB |
| Partial A | 234.32 | AAWD | 234.32 | AAWD |
| Partial B | 732.73 | EFMC | 732.73 | EFMC |
| Item | 6434.23 | ITMX | 6434.23 | ITMX |

708 →

| Element | Value In | Category In | Value Out | Category In |
|---|---|---|---|---|
| Input A | 25.52 | AAVC | 25.52 | AAVC |
| Input B | 69.11 | EFNB | 69.11 | EFNB |
| Partial A | 233.34 | AAWD | 233.34 | AAWD |
| Partial B | 732.67 | EFMC | 732.67 | EFMC |
| Item | 6334.23 | ITMX | 6334.23 | ITMX |

FIG. 7

REAL-TIME OR EVENT-BASED ANALYSIS OF PROCESS DATA

FIELD

The present disclosure generally relates to processing data in a database, such as receiving process data at a database system and querying and analyzing such data. Particular implementations relate to performing such receiving, querying, and analysis during a process, such upon the occurrence of a defined event or a real-time request from a user or software application.

BACKGROUND

Databases are commonly used in enterprise resource planning (ERP) and material requirement planning (MRP) applications, where organizations collect data related to the enterprise, including information related to supply of materials, product planning, purchasing, manufacturing, shipping, inventory, marketing, and sales. The collected data can be used for a variety of purposes, including determining whether an organization can take certain actions, how to take actions in an optimized manner, or to compare expected or planned values with actual values.

Typically, actual values from a production process are received at predefined intervals, such as according to a periodic reporting frequency. The volume of data to be processed can be large, which can result in long processing times before the data is available. Correspondingly, there can be a significant delay before data comparing actual and planned values is available. In addition, planning data and actual data is typically maintained in different formats, which can further increase processing time and effort. Because of the data processing load, typically, actual and comparison data is available at a high level, such as for individual process requests or reporting periods, rather than for individual operations or components involved in the process. Thus, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for facilitating data acquisition and processing, such as obtaining actual data, including input element use data, in real time, such as upon request or in response to the occurrence of an event. The actual data can be compared with planning data to provide a report on variances from planning data.

In one aspect, a method is provided for generating a report of variances between planned and actual input use values using data received from a plurality of sensors. Data is received over a network from a plurality of hardware sensors associated with a plurality of operations. The data includes input element use data. The operations are associated with a process, the process having a process ID.

The input element use data is stored in one or more database tables. A database is queried for a process specification associated with the process ID. The process specification includes a hierarchy of nodes, where a node represents a particular operation. The hierarchy describes an operation sequence for the process having the process ID. The database is queried for planned values associated with the hierarchy of nodes. The planned values are compared with the stored input element use data to determine one or more variance values, where the input element use data represents actual values. A report is generated that includes the one or more variances values between the planning values and the actual values. The report is rendered for display.

According to another aspect, a method is provided for generating a report of variances between planned and actual input use values using data received from a plurality of data sources. Planning data is generated for a process having a process ID. The process has a plurality of operations, the operations having operation IDs. The planning data is stored in a database table having a first format. Data is received from a plurality of data sources associated with the plurality of operations of the process having the process ID. The data includes input element use data.

The received data is stored in a second database table having the first format. The first and second database tables are queried to retrieve at least a portion of the planning data and the input element use data. For multiple operations of the plurality of operations, planned data values for the operations are compared with input element use values to generate variance values. A report is generated that includes the multiple variance values. The report is rendered for display.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 6 presents example database table formats for actual data and planning data, where the planning data and actual data are maintained in different formats.

FIG. 7 presents example database table formats for actual data and planning data, where the planning data and actual data are maintained in a common format.

DETAILED DESCRIPTION

Example 1—Overview

Data, such as maintained in a database, can be used for a variety of purposes, including for planning activities, such as planning for the production of a finished good. Planning may include determining steps required to produce the finished good, including associated labor and raw materials needed at each of various steps. It can be useful to compare that actual results of a process with what was anticipated at the planning stage. For instance, such information can be used to adjust the process (such as to increase its efficiency), to adjust the plan to make its predictions more accurate, or for various operation and reporting purposes of an organization.

Figure 1:
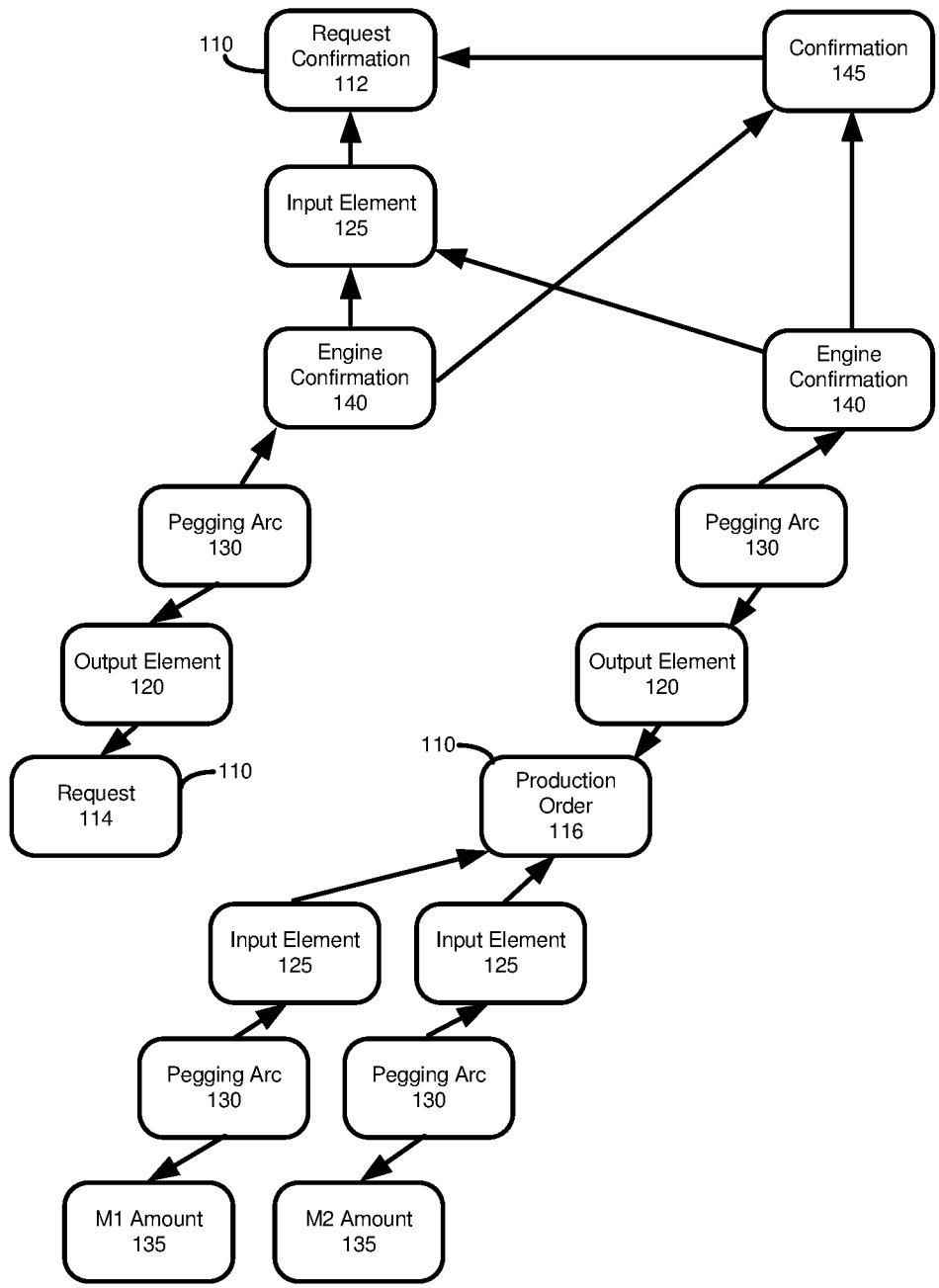
FIG. 1 is a diagram illustrating the relationship between an input and an output used in fulfilling a request, and queries that may be made relating to the request.

FIG. 1 is a diagram illustrating various requests (such as a request to receive or have-produced an item) or request confirmations 110 and related objects. FIG. 1 can represent the modelling of a request confirmation 112 along with a request 114 that is being confirmed and a production order 116 to request that an item or collection of items be produced in response to the request 114. The production order 116 is associated with one or more output elements 120 (which can be the item requested, or an intermediate, or partial, item generated during the production of the requested item), one or more input elements 125 (such as raw materials or intermediate output items), or a combination thereof. The order information can describe what kind of processing is planned or associated with the production order 116, when it should take place, and what production facilities are involved in fulfilling or carrying out the order.

Relations 130, which can be referred to as pegging arcs, can be used to relate input elements 125 and output elements 120 (e.g. describing quantities and types of input elements needed to produce an output element). Once a chain of orders 110 can be established, and all requirements are satisfied via stock 135, or purchasing from a third party, the planned quantity of products and the availability date can be confirmed, such as to a customer, through notifications 140, 145.

In FIG. 1, the direction of the arrows can indicate a relationship between the objects (110, 116, 120, 125, 130, 135, 140, 145). For example, an input element 125 can belong to a request 110. Each type of object can be associated with one or more database records in one more database tables of one or more databases.

A user may issue various queries regarding a request 110, or otherwise relating to the objects in FIG. 1. For example, a user may wish to quantify and valuate the input elements 125 expected to be needed to produce an output element 120. Once an output element 120 is produced, database records may reflect actual quantities of input elements 125 used to produce an output element 120, and a user or software application can query such records. A user or application can also perform queries to compare expected, or planned, quantities of input elements 125 to actual quantities of input elements used in fulfilling a particular production order 116, including to determine the variance between these quantities and identify steps that may be associated with inefficiencies or problems or for reporting purposes.

Typically, data regarding quantities of input elements 125 is available once the final output element 120 is produced (e.g., a finished item), or when the overall request 114 is fulfilled. This can be undesirable, as, in addition to the delay before a query can be executed that uses or returns actual values, query execution can be time consuming, as large volumes of data are typically involved, and often only summary data may be available (e.g., aggregated data for the final output element 120, rather than data for individual intermediate output elements 120 or individual processing steps involved in producing the final output element). In many cases, users may be limited to performing queries at particular time intervals, such as monthly or quarterly, but, even then, because of lengthy query execution times, results may not be available until several days or more into the next time interval. As a result of the lengthy processing times, and other considerations, data may not be available at shorter intervals, or in real time. Correspondingly, as mentioned above, granular data may not be available.

A particular complication can arise in comparing actual values with planned values. That is, planning data and actual data are typically maintained in different formats. Planning data, for instance, can be broken into a plurality of categories, and input and output can be tracked per-category. Actual data is typically also maintained in a plurality of categories, but input and outputs are tracked between categories. That is, an input to one category is typically an output of another category, and vice versa. Thus, relationships that are defined for actual data may be not be defined for planning data, which can result in additional calculations being needed to compare planning data with actual data, and can introduce inaccuracies.

Disclosed technologies can provide for calculating actual values of input elements 125 and output elements 120 associated with a process more frequently that is typically possible. This can also allow for more frequent calculations of variance or other comparisons or calculations using planning data and actual data. In some cases, the calculation can be carried out on, and some cases can be triggered by, a particular event associated with the process, such as the completion of a particular instance of the process or a particular step of the process for a particular instance of the process. In other cases, the calculation can be carried out on demand, such as using the most recent actual data that is available. In addition to being obtainable at increased frequencies, or on demand, disclosed technologies can allow more granular data and analysis to be presented to users.

In some aspects, the disclosed technologies can include, and be facilitated by, receiving signals from components associated with a production process. For example, a production process may be carried out using one or more machines or in association with one or more computing devices. Signals from a machine or computing device may be used to determine current values for input elements 125 or output elements 120 associated with a particular process step with which the machine or computing device is associated. Signals received from a machine or computing device may also be used to determine events, such as events which may be used to execute, including automatically, queries and reports of actual values, including reports that compare actual values to expected or predicted values (e.g., associated with planning data).

In some disclosed technologies, planning data and actual data can be maintained in a common format. Maintaining the planning and actual data in a common format can simplify comparisons between the data, which can reduce query processing time, including allowing queries to be executed more frequently. In at least some cases, querying data can be performed in real time or upon the occurrence of a discrete event during the process of producing an item or group of items, or at the end of such a process (but, before the end of a standard reporting period).

Disclosed technologies, including receiving granular data from production machines and computing devices, maintaining planning and actual data in a common format, or a combination thereof, can also facilitate increased data granularity. For instance, actual data can be obtained from individual (or sub-groups) of production machines or computing devices. In turn, such granular, actual data can be compared with planning data of corresponding granularity to allow variance (and optionally other comparisons or calculations) to be calculated on a more granular level than is typically possible.

Figure 2:
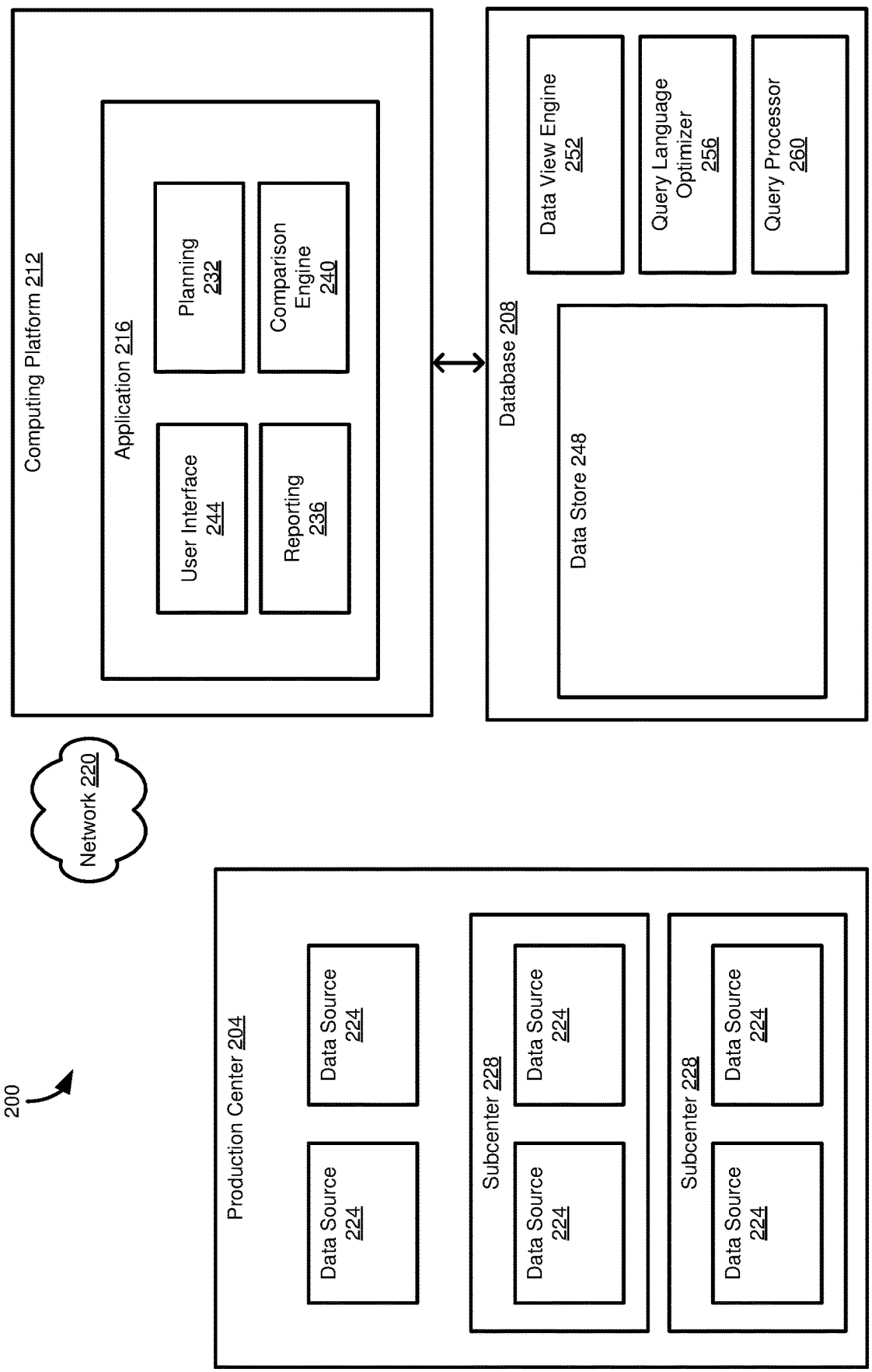
FIG. 2 is a block diagram illustrating a production center, a computing platform, and a database in communication over a network.

Example 2—Example Computing Environment with Data Sources Providing Data to a Database FIG. 2 is a block diagram of an environment 200 that includes a production center 204, which carries out a process for producing one or more items, a database 208, which can receive, store, and process data received from the production center, and a computing platform 212, which can host a software application 216 that can interact with the database 208. The database 208 and the production center 204, and optionally the computing platform 212, are connected through a network 220.

The production center 204 can include a plurality of data sources 224, such as machines or computing devices. In some cases, a data source 224 can be a computing device that is incorporated into a machine. Data sources 224 can determine operations that have been carried out in a production process, or the results of such operations. For example, a data source 224 can report the number of times a particular operation (e.g., a particular actuation of a machine component, such as an actuation associated with a manufacturing task) was carried out, which can be used to determine what input elements (e.g., raw materials) were used or consumed during the operation, and what output elements (e.g. finished or semi-finished items) were produced during the operation.

A data source 224 can be, or include, a hardware sensor, such as an IMU, accelerometer, magnetometer, GNSS receiver, thermometer, thermocouple, rheometer, rheostat, viscometer, pressure sensor, motion sensor, transducer, light sensor, radiation sensor, electrical sensor, or another type of sensor. In some cases, a hardware sensor can directly send data to be received at the database 208. In other cases, the hardware sensor can send data to a computing device, including a computing device incorporated into a production machine, which then can send the data to be received at the database 208. As used herein, sending data includes sending data directly between two computing devices or system, or through one or more intermediate computing devices or systems (including routers or switches).

Data sources 224 can, in some cases, send data when directed by a user, such as a machine operator. For instance, an operator can enter a command when an operation is initiated or completed, or when a particular event occurs. Entering a command can include actuating machine controls (e.g., button or dials on a machine or a computing device coupled to the machine) to begin a manufacturing operation, or actuated as part of the manufacturing operation. A user can also enter various quantities associated with a manufacturing operation, such as input elements used, output elements used, any excess input elements used, scrap produced, or material to be reworked.

As mentioned, data sources 224 can also provide data about input elements and output elements. For instance, a sensor may determine when (and how much) of an input is feed into a machine, or operated on by a machine. A sensor may measure when (and how much) of an output is produced by a machine. Sensors may also be used to determine when an operation has not been carried out successfully, including determining an amount of waste, or scrap, that was produced by the operation. Information regarding inputs, outputs, and waste can also be supplied by an operator (e.g., a machine operator) associated with a data source 224.

In some aspects, data source 224 can be grouped into subcenters 228. A subcenter 228 can be one or more data sources 224 that are used to carry out one or more particular operations, or groups of operations, of the production center 204, including in producing a particular item. If different items are produced by the production center 204, the grouping of data sources 224 into subcenters 228 can differ between items. In at least some cases, the grouping of data sources 224 into subcenters 228 can be accomplished logically by the database 208 or the computing platform 212, instead of, or in addition to, a physical grouping (or network or logical grouping) at the production center 204.

The production center 204, including subcenters 228 or individual data sources 224, can be associated with indirect input elements. An indirect input element can be an input element that is not directly (or solely) associated with the production of a particular item, such as a shared resource, for example, a utility (e.g., power, water). However, it can be useful to apportion a portion of indirect input elements to particular items, or collections of items, where the items can be finished items or items at various stages of completion (e.g., after the completion of one or more steps, but less than all, of the steps involved in the production of the item).

The application 216 can include a planning component 232. The planning component 232 can allow a user to create and edit plans that track various steps involved with the production of one or more types of item, including input elements needed for the item, assignment of a portion of indirect input elements to an item's production, and output elements produced during production (including the final item produced).

The input elements (including direct and indirect input elements) and output elements can be associated with the production center 204 at various levels of granularity. In particular aspects, the disclosed technologies are useable to associate input and output elements with particular data sources 224, which can also allow estimated input elements (including apportioning estimated indirect input elements) and estimated output elements to be associated with particular subcenters 228.

The application 216 can include a reporting component 236. The reporting component 236 can allow a user to view data generated during the production of a particular item or collection of items. As with planning data, reporting or actual data can be associated with the production center 204 at various levels of granularity. In particular aspects, the disclosed technologies are useable to associate actual inputs (including apportioned actual indirect inputs) with particular data sources 224, which can allow actual input elements and output elements to be associated with particular subcenters 228.

The application 216 can include a comparison engine 240. The comparison engine 240 can be used (including being called by the reporting engine 236) to generate data comparing planned or estimated input element or output element data with actual input or output element data. In cases where the planned input elements and output elements are calculated and tracked at the level of data sources 224, comparison results of the comparison engine 240 can be provided on the level of data sources 224, as well as at the level of subcenters 228 and the production center 204 overall.

The application 216 can include a user interface 244. The user interface 244 can allow a user to access the planning component 232, the reporting engine 236, and the comparison engine 258, including creating and editing plans for the planning component 232, viewing actual data using the reporting component 236, and requesting and reviewing comparison data using the comparison engine 240.

The data from the data sources 224, as well as planning data associated with the planning component 232, reports generated (or reporting templates used by) the reporting engine 236, and comparison results generated by the comparison engine 240, can be maintained in a data store 248 of the database 208. In at least some implementations, the data store 248 can be a data store against which database write operations (such as SQL INSERT, UPDATE, or DELETE operations) are executed, as well as database read operations (such as SQL SELECT, WHERE, or JOIN operations). For example, the data store 248 can be used to process OLTP (online transaction processing) requests from the data sources 224 or a component of the application 216. The data store 248 can also be used to process OLAP (online analytical processing) requests from the application 216. In other cases, data for OLTP operations can be stored in a separate data store, or database, from data for OLAP operations.

The database 208 can include a data view engine 252. The data view engine 252 can be used, for example, to produce an aggregation or visualization of data from the data store 248 and, optionally, other data sources. In some cases, data to be included in a view, such as to be provided to a user, can be distributed among multiple sources, such as multiple stores of the data store 248 and/or other data sources, or among multiple tables in one or more of the stores of the data store or other data sources. The data view engine 252 can be used to map data maintained in the data store 248 and/or other data sources to a definition for the view or representation.

A query language optimizer 256 can be included in the database 208. The query language optimizer 256 can be used to create (and optionally store or retrieve) an execution plan for a query language statement. For example, while a query language statement (such as a SQL statement) specifies information that data should contain, it may not describe how to carry out read and write operations associated with the statement. The query language optimizer 256 can determine appropriate operations to carry out the query language statement, including attempting to optimize the operations, such as in a query plan. The operations can be executed by a query processor 260. The database system 208 (for example, the HANA database system of SAP SE of Walldorf, Germany) can be in communication with the computing platform 212 (for example, the NETWEAVER platform of SAP SE of Walldorf, Germany).

Example 3—Example Process Components

FIG. 3A is a schematic diagram of a process 300 for producing an item 304 from input elements 308 and partial, or intermediate, items 312. The partial items 312 and item 304 are outputs of operations 316. The partial items 312 can be both an output element from an operation 316 and an input element 308 to another operation.

FIG. 3B is a schematic diagram of the process 300, illustrating the sequence of operations 316. That is, while FIG. 3A includes partial information about sequencing of the operations 316, it may not fully reflect the sequence of operations in the process 300, as, for example, some operations which are not dependent on each other can be performed concurrently or sequentially. For instance, in FIG. 3A, process B is not dependent on process C, although process D is dependent on both process B and process D. FIG. 3B clarifies that processes C and B are carried out concurrently. In contrast, even though processes D and E are not dependent on each other, FIG. 3B indicates that these processes are performed sequentially. Carrying out independent process sequentially rather than concurrently can occur for a variety of reasons, such as if a particular machine or operator is not available to conduct two operations 316 concurrently, or if because further processing of a partial item 312 is to be delayed to assist in the production process (e.g., to allow paint to dry, a part to cool, or an adhesive to set).

The process 300 can be associated with various events. An event can be the delivery or use of an input element 308. An event can be the production of a partial item 312 in an operation 316 or the use of a partial item in another operation. An event can be the production of one, or a particular number, of items 304. An event can be a particular step of an operation 316, the initiation of an operation, or the completion of an operation.

Events can produce actual data. Events can also act as triggers for one or more actions. For instance, an event can trigger data being sent (e.g., from a data source 224 of FIG. 2 to the database 208), which can be all data generated to date or data generated since data was last sent. Or, an event can trigger the calculation of a comparative value (e.g., comparing an actual value associated with the event/trigger to a predicted or planned value). The event can also trigger a report, including a report that includes an actual value associated with the event/trigger, or a comparison between the actual value and a predicted or planned value.

As an example, an event signaling successful competition of Process C can be associated with the production of appropriate instances of partial item A (e.g., the number of partial items expected or actually produced from Process C), as well as the consumption of the appropriate input elements for Process C. For instance, if Process C is excepted to consume one unit of Input A and one unit of Input B to produce one unit of Partial Item A, a signal indicating that Process C has completed can indicate that the amount of Inputs A and B on hand should be reduced by at least one unit each (and possibly more, if Operation C produced waste), and the amount of Partial Item A on hand can be increased by one unit.

In some cases, a partial item 312 can be assigned a value. The value, in some examples, can include values associated with the input elements 308 used in the corresponding operation 316. The value can also include an apportioned amount of indirect input elements, which can be an actual amount of indirect input elements or a predicted amount of indirect input elements. As shown in FIG. 3C, for example, indirect input elements can be measured or tracked as the process 300 is being carried out, and a portion of the value of such elements can be apportioned to a completed operation 316 of the process. For instance, Partial Item A can be associated with the value of Input A, the value of Input B, and an apportioned amount of indirect element value, such as based on a duration or using an assigned rate.

As the operations 316 build on each other as the process 300 nears the completion of an item 304, the value of partial items 312 closer to the end of a process can include the value of input elements and indirect input elements used to produce the particular partial item and earlier partial items. Taking Partial Element F, this partial item 312 was produced using Partial Items C, D, A, and B. In turn, these Partial Items were produced using Input Elements A, B, B, C, B, D, E, F, and G. So, the value of Partial Item F can be A+3B+C+D+E+F+G, along with the appropriate portion of indirect input element value.

As will be further explained, an organization may wish to track amounts of input elements 308 and partial items 312 currently on hand, as well as items which have been used and which may be needed for the operations 316 of the process 300 (e.g., to produce a desired number of partial items or items 304). For instance, the amount of Input B on hand can affect how much Partial Item A and Partial Item B can be produced, as well as an amount of the item 304 that may be produced. As partial items 312 can be assigned a value, including the value of the inputs elements 308 used to produce the partial item, an organization may wish to track what partial items exist at a given time. For instance, after Process D, Partial Items A and B will have been transformed into Partial Item C. So, to reflect a current status, the number of available units of Partial Item C should be increased, and the number of available units of Partial Items A and B should be reduced. In at least some cases, when an item 304 is produced, the value can be determined in another manner than values of input elements 308, and apportioned amounts of indirect input elements, used to produce the item 304. For instance, the item 304 may have a market or contract value.

Typically, operations 316 are not completely efficient. For instance, if Process C is expected to use one unit of Input A and one unit of Input B to produce one unit of Partial Item A, issues such as operator error, mechanical malfunction, or poor quality input elements 308 may result in multiple units of Input A or Input B being needed to produce the unit of Partial Item A. Thus, operations 316 may be associated with an excess amount 330, which can be zero if the operation completes as expected, or can be greater than zero otherwise. In some cases, an operation 316 can be associated with a predicted or planned excess amount 330. When an operation 316 is completed, an actual excess amount 330 can be determined, and, if a predicated excess amount is available, can be used to determine a variance, which can be positive (i.e., more input elements 308 were used than predicted) or negative (i.e., less or no excess input elements were used).

In some cases, an excess amount 330 can represent an excess amount of input element 308 used to complete an operation 316 that are specific to the operation. For instance, a problem with process D might use excess of Input Element B. In other cases, such as when an input element 308 is a partial item 312, an excess amount 330 can represent input elements 308 that are not specific to the operation. Taking Operation G as an example, if Operation G failed when only Partial Item C was involved, Partial Item C would be the excess 330 for that operation, but, as Partial Item C was produced by Process D, all of the inputs to Process D would be part of the excess. So, the use of an excess unit of Partial Item C would involve excess use of Input A, Input B, Input C, Input B, Input D, Input E, and Input F. Stated another way, if Operation G failed using Partial Item C, another unit of Partial Item C would be needed to produce a unit of Partial Item F. On the other hand, if Operation G failed at a point where only Partial Item D was involved, only Input G would be included as excess 330. If Operation G failed at a point where both Partial Item C and Partial Item D were involved, then all of the corresponding input elements would be included as excess 330. Accordingly, excess 330 can affect input elements 308 on hand, as well as increase the input elements needed to produce a particular item 304 or collection of items.

Other factors that can affect the production of an item 304 and its partial items 312, as well as excess 330, include the nature of the input elements 308. That is, taking Process C as an example, Input A is used. Input A may be associated with a particular quality or supplier. If Input A is not available, Input A' may be an acceptable substitute, although it may have a higher value, lower quality, etc. If the value is higher than the value of input elements 330 needed to produce an item 304 or collection of items will be higher. If the quality of A' is less than A', Process C, or a subsequent process using Partial Item A, may be more likely to fail, resulting in excess. In a similar manner, if A' is not available, A" may be substituted, A'" may be substituted for A", and A"" may be substituted for A'".

The process 300 may be associated with a process ID. Database records associated with the process can be accessed, such as via a query, using the process ID. The operations 316 of FIG. 3A and FIG. 3B can be represented as a hierarchy of nodes, where a node can be associated with an operation, and the operation can have an operation ID. Partial items 312 and input elements 308 can also be maintained as, or associated with, a hierarchy of nodes, including linking partial items and input elements with a node for a corresponding operation 316, such as using the appropriate operation ID.

Figure 3:
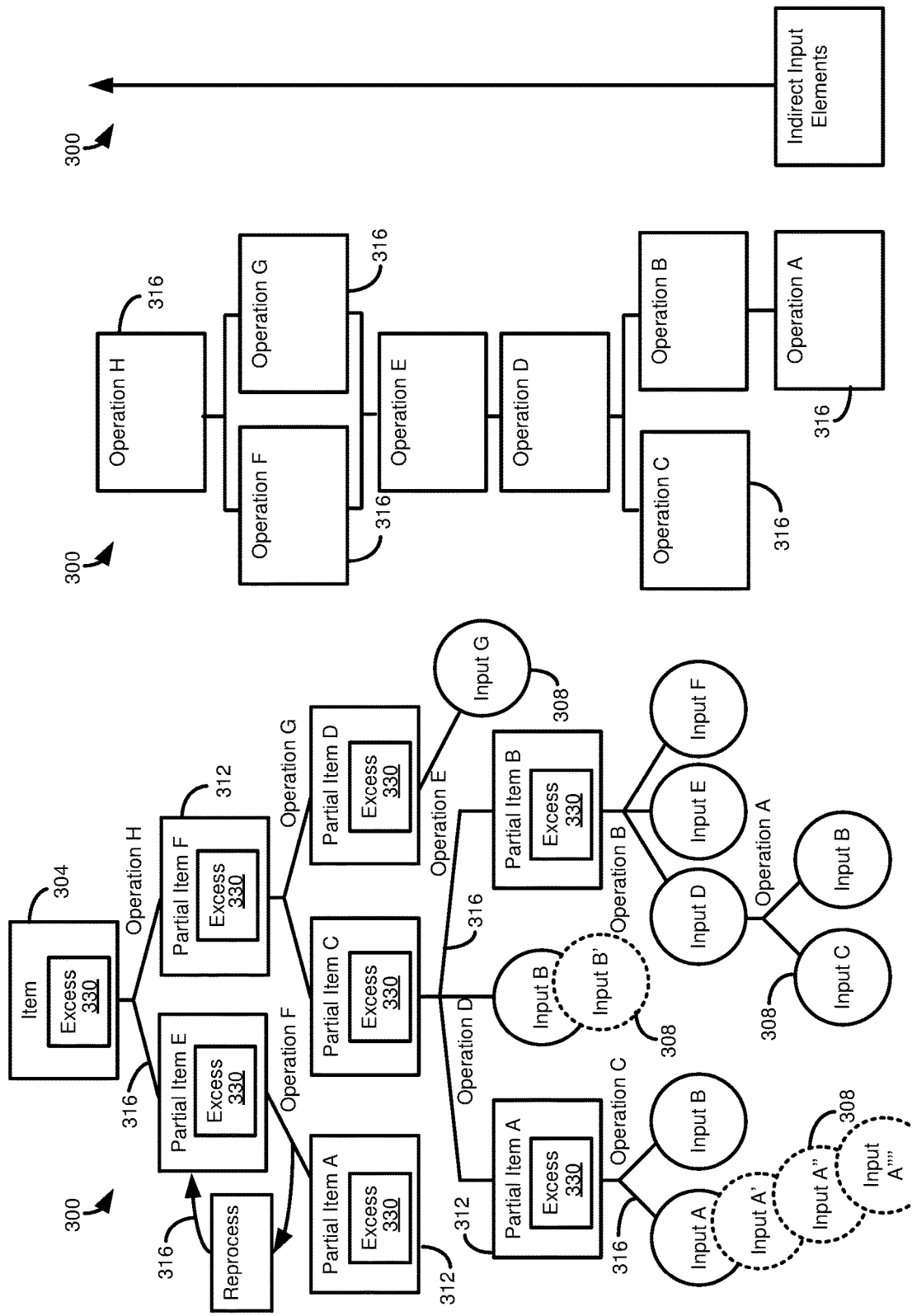
FIG. 3A is a schematic diagram illustrating a process for producing an item, including inputs, partial items, and operations involved in such production.
FIG. 3B is a schematic diagram illustrating an operation sequence for the process of FIG. 3A.
FIG. 3C is a schematic diagram illustrating indirect input elements associated, at least in part, with the process of FIG. 3A.
Figure 4:
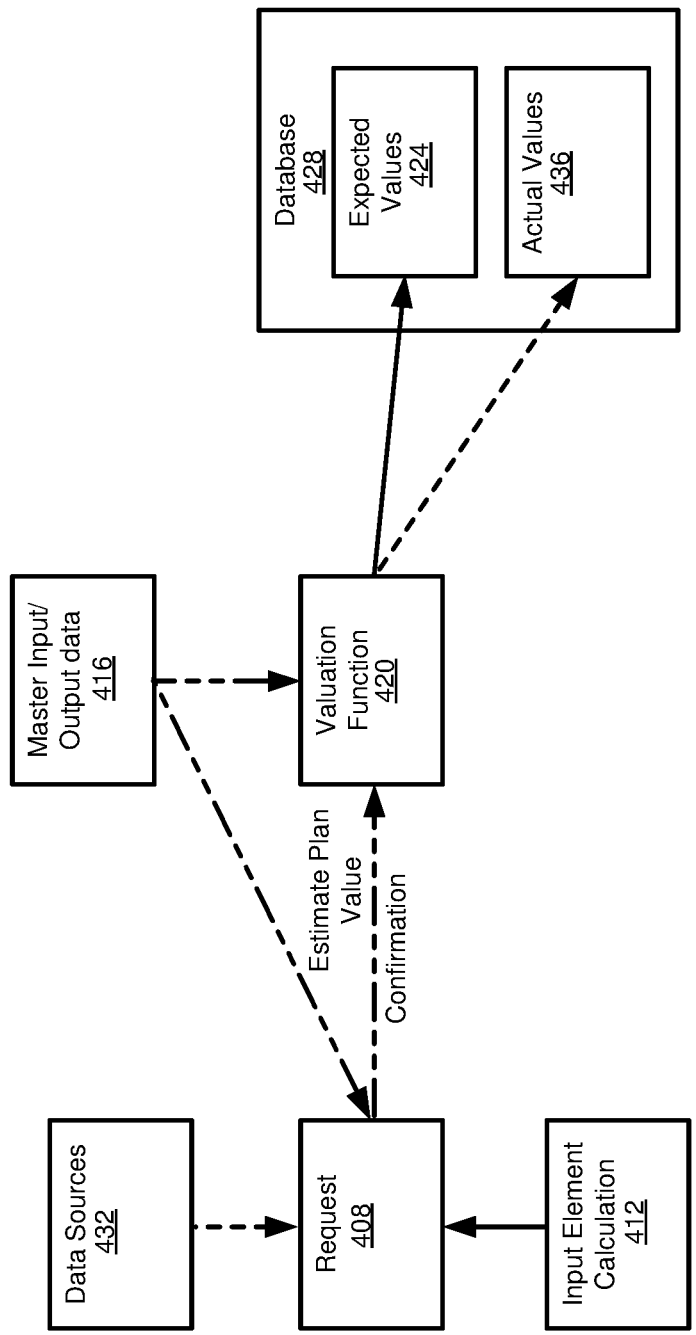
FIG. 4 is a diagram illustrating how planning data and actual data can use common master input/output element data and common valuation functions.

Example 4—Example of Expected and Actual Values Calculation Using Common Valuation Function FIG. 4 illustrates how actual values and planned values associated with a process, such as the process 300 of FIGS. 3A-3C, can be calculated. FIG. 4 illustrates a request 408 for one or more items. The item can be associated with a production process, such as the process 300. In order to determine the value of input elements needed to meet the request 408, an input element calculation 412 can be performed, such as using the process schematic of FIG. 3A to estimate the input elements needed to produce the item or items (including, optionally, accounting for any expected amounts of excess input elements and an apportioned amount of indirect input elements).

Needed input elements determined from the input element calculation 412 can be compared with master input/output element data 416, such as to determine a value of the input elements needed for the request 408, in addition to, for example, apportioning indirect input elements, accounting for estimated excess input elements, and calculating values of partial items and completed items. The estimated plan value can be processed using a valuation function 420, such as to account for input elements used, partial items produced and used, and completed items being produced and cataloged as registered as in the possession of the organization or being transferred from the possession of the organization. For instance, the value of items in the possession of the organization may be affected by the value of the input elements used to produce the item, and thus the value of an item may fluctuate as the value of the input elements changes. The valuation function 420 may determine whether items or partial items are removed from possession in the order they are produced, in the reverse of the order they are produced, using an average value, or in some other manner. After being processed by the valuation function 420, the data (e.g., planning data) can be stored in an expected value store 424 of a database 428.

FIG. 4 also illustrates how actual data can be obtained, processed, and sent to the database 428. Data Sources 432 (e.g., sensors coupled to production machinery) are associated with the request 408 (including using a plan for the process 300). The data sources 432 can provide data (e.g., through signals sent by hardware sensors) regarding operations that have been completed, input elements or partial items that have been used, items or partial items that have been produced, excess input elements or partial items used, indirect input element used (which can then be apportioned to the item or items in the request 408), etc. The data from the data sources 432 can be processed using the master input/output element data 416 and the valuation function 420 in a similar manner as data obtained using the input element calculation 412. For instance, values can be assigned to an actual number (and, in at least some cases, type, when multiple possible input items may be used) of input elements used in the production process, and the valuation can take into account items and partial items that have been produced and are in possession of the organization or removed from the possession of the organization (e.g., transferred as part of the request 408 or, in the case of partial items, used to produce a final item or another partial item). Data produced after processing data from the data sources 432 with the valuation function 420 can be stored in an actual data store 436 of the database 428.

Example 5—Report Generation Using Planned Values and Actual Values

Figure 5:
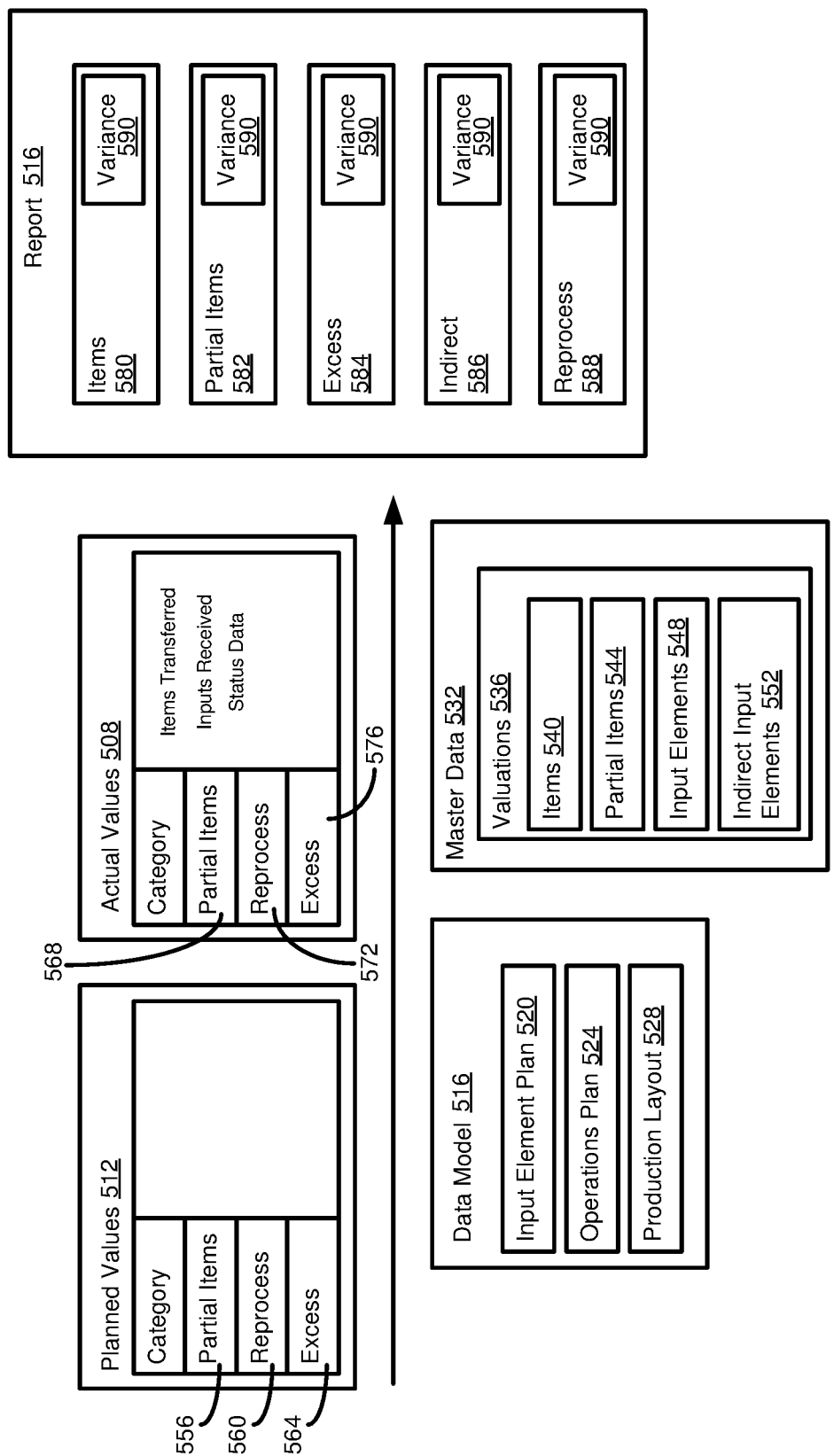
FIG. 5 is a diagram illustrating how planned values and actual values can be correlated with a data model and master data to provide a report that includes variances.

FIG. 5 illustrates how actual values 508 and planned values 512 may be used to provide a report 516 that includes actual values and their variance from planned values. The actual values 508 and the planned values 512 can be associated with database records (e.g., of the database 208 of FIG. 2).

The actual values 508 and the planned values 512 can be associated with a data model 516. The data model 516 can include an input element plan 520 (which can be, or be similar to, the process 300 of FIG. 3A), an operations plan 524 (which can be, or similar to, the process 300 of FIG. 3B), and a production layout 528 (which can be, or be similar to, the organization of the production center 204 of FIG. 2, which can detail which data sources are associated with particular input elements, items, partial items, operations, etc.). The data model 516, including the input element plan 520, the operations plan 524, and the production layout 528, can be maintained in one or more database tables, or database views based on one or more underlying database tables.

The actual values 508 and the planned values 512 can access master data 532. Master data 532 can include valuations 536 (which can be current, historical, or forecasted) for items 540, partial items 544, input elements 548, and indirect input elements 552. One advantage provided by disclosed technologies is that, in at least some cases, the report 516 can be calculated in real time, and thus the actual values 508 and the planned values 512 can use consistent valuations 536, which can make the report more accurate (e.g., differences more closely reflect changes in forecasted and actual production conditions, rather than arising from non-meaningful discrepancies in data underlying the calculation of actual and planned values).

Planned values 512 can be calculated using at least certain components of the data model 516. For instance, a number of partial items 5556 can be calculated based on a number of items to be produced and the input element plan 520 and the operations plan 524. These values can be associated with particular elements in the production layout 528, such as particular data sources (e.g., machines) or collections of machines or operation components (e.g., a subcenter of the production center, such as a particular production line). Similarly, the data model 516 can be used to determine an amount of partial items 556 (or, in at least some cases, items) that may still be useable (and thus not excess input elements), but which may requiring addition processing before being classifiable as partial items or items, indicated as reprocess 560. The data model 516 can also be used to estimate excess input elements 564 that may be used in producing a particular amount of items according to the data model.

Typically, when planning values are calculated, data used to produce the values is different than data used to produce the actual values. That is, planning data may be generated when a request is initial received, which can be weeks or months before the request is fulfilled. In turn, actual values are typically not available until the request is fulfilled, and in many cases, not until a later date (e.g., an end of a particular reporting period, such as the end of a year, quarter, or month). In addition to delayed comparisons, because actual values are not available, comparative data can be skewed if master data used to calculate planned and actual values is not consistent. As described, disclosed technologies can provide for real time or event-based (e.g., events during a production process) calculation of actual values, or real time or event-based calculation of comparative values, where calculations can be more accurate because, when carried out concurrently, they can access the same master data 532.

Actual values 508 can be determined using input received during the production process (including determined completion of the production process or at times prior to the completion of the production process). The input can be from a data source (e.g., a computing device or hardware sensor) or from an operator (e.g., an operator providing input through a mobile computing device, a desktop or laptop computing device, a computing device incorporated into a production machine, or through an input device (e.g., button, switch, dial) coupled to a computing device. Input can be a numerical value (e.g., an amount of partial items or items to be reprocessed 572, an amount of an item, partial item, or input element to be classified as excess input elements 576, an amount of an input element (which can include a partial item) used or consumed in a process, or an amount of items or partial items produced 568. Input can also represent an event, such as the initiating or completion of an operation in a production process.

Actual values 508 can be correlated with components of the data model 516, including to allow for comparison with planned values 512 or allowing for granular analysis of actual values (e.g., values associated with a particular production operation, operator, data source, subcenter, etc.) In some cases, actual values 568 can be received from data sources or operators in real time, and any correlations or calculations using such values can be performed when received. In other cases, actual values can be received from data sources or operators upon the occurrence of an event, or correlations or calculations using actual values can be performed upon the occurrence of the event. The disclosed technologies can allow analysis and comparisons to be made more quickly than in prior processes, as well as to enable more granular analysis, such associating planned 512 or actual values 508 with particular data sources or production subcenters, rather than using or providing summary data.

FIG. 5 illustrates particular values that can be provided in the report 516. The report 516 can include a display of actual values for items produced 580, partial items produced 582, excess input elements used 584, indirect input elements 586 apportioned to a particular production run (e.g., in producing the items), and an amount 588 of items or partial items (or, in some cases, input elements) that are to undergo additional processing so that they can be then classified as items or partial items (or input elements).

The report 516 includes variances 590 for each of the actual values 580, 582, 584, 586, 588. The variances 590 can be calculated using the planned values 512 and the actual values 508. As explained above, because, in at least some cases, the planned values 512 and the actual values 508 can use common master data 532, the variances 590 can be more accurate than in prior techniques.

Although the report 516 is shown showing single values and variances 590 for each type of actual value, in at least certain aspects, the report can provide actual values, variances, planned values, or a combination thereof on a more granular level. For instance, the report 516 can provide such information for a particular production operation or group of production operations, for a particular data source or group of data sources (including, for example, a subcenter), or for a particular partial item. Thus, an operator, such as an operator at a production center, can be provided with a view of not only what operations are being carried out by the production center, but also values associated with items and partial items produced, input elements used, excess input elements used, indirect input elements used, and items or partial items to be reworked.

Example 6—Example Planning Data and Actual Data Tables Having Different Formats

FIG. 6 illustrates example tables, which can be maintained in a database system, for planned values and actual values. In particular, table 604 illustrates example database records for actual values and tables 608, 612 illustrate example database records for planned values.

Tables 604 and 608, 612 are maintained in different formats. In table 604, value changes are tracked with respect to a plurality of categories. For example, an increase in a value in one category can be offset by a commensurate decease in a value in another category. As shown in FIG. 6, an increase in Input A is assigned to category AACV, and is offset by a decrease in Input A in category INVA. In a specific example, category AACV can represent a particular production operation and category INVA can represent a quantity of Input A that is available.

Units of input categories and output categories can be the same in some cases, and different in other cases. Similarly, in some cases, for a particular element, input and output values can be directly comparable (e.g., after any unit conversions are carried out), while in other cases the values can vary, such as being subjected to mathematical operations, including operations involving other values (e.g., applying a mathematical operation to the value and a constant, or applying the mathematical operation to the first value and one or more other values).

In contrast, tables 608 and 612 include database records for a specific category. The tables 608, 612 reflect changes to element values in that category, but do not include information regarding changes to be made to related categories. That is, for example, table 608 includes an entry 620 reflecting a decrease of 10.55 of Item A in category AAVC, but does not indicate what category increased as a result. The increase can be reflected in table 612, in entry 624. However, these related changes cannot both be found by simple analysis of the individual tables 608, 612, and may not even be identifiable even if both tables are queried.

As tables 604 and 608, 612 are in different formats, it can be difficult to directly compare actual values from table 604 with planned values from tables 608, 612. For instance, planning data may only be generated from one of tables 608, 612. Thus, merely importing data from table 608 or 612 into the format of table 604 may not provide all of the information in table 604. In some cases, it may be possible to configure rules to supply missing information. For instance, a rule may be defined that an increase in A in category AAVC should produce a corresponding decrease in A in category INVA. However, in practice, such rules may be complex (e.g., for database tables with a large number of non-matching fields, or when an account may be associated with multiple accounts, and complex rules may be needed to determine which of the multiple accounts should be used for a particular entry), which can increase query processing time, or incomplete, in which case some values may not be available, or may be calculated in a different manner than in table 604, which can result in inaccurate comparisons.

Example 7—Example Planning Data and Actual Data Tables Having Common Format

FIG. 7 illustrates example tables, which can be maintained in a database system, for planned values and actual values. In particular, table 704 illustrates example database records for actual values and table 708 illustrates example database records for planned values. In contrast to the tables of FIG. 6, the planning data in table 708 is maintained in the same format as the actual data in the table 704. Maintaining planning and actual data in the same format can greatly simply comparison between planned values and actual values, including saving computing resources such as processor and memory use, as well as making query execution faster (e.g., by reducing the number of tables to be queried). Even if rules are used to associate a value change in one account with a commensurate change in another account, the rules can be applied more frequently (either in real time or upon the occurrence of an event), which can reduce query processing time and computing resource use, and allow data to be acquired and analyzed on a more granular level. In a particular example, the tables 704, 708 can be ACDOCA tables of S/4 HANA of SAP SE of Walldorf, Germany.

Example 8—Example Calculation of Total Partial Item Values at Posting Event

Figure 8:
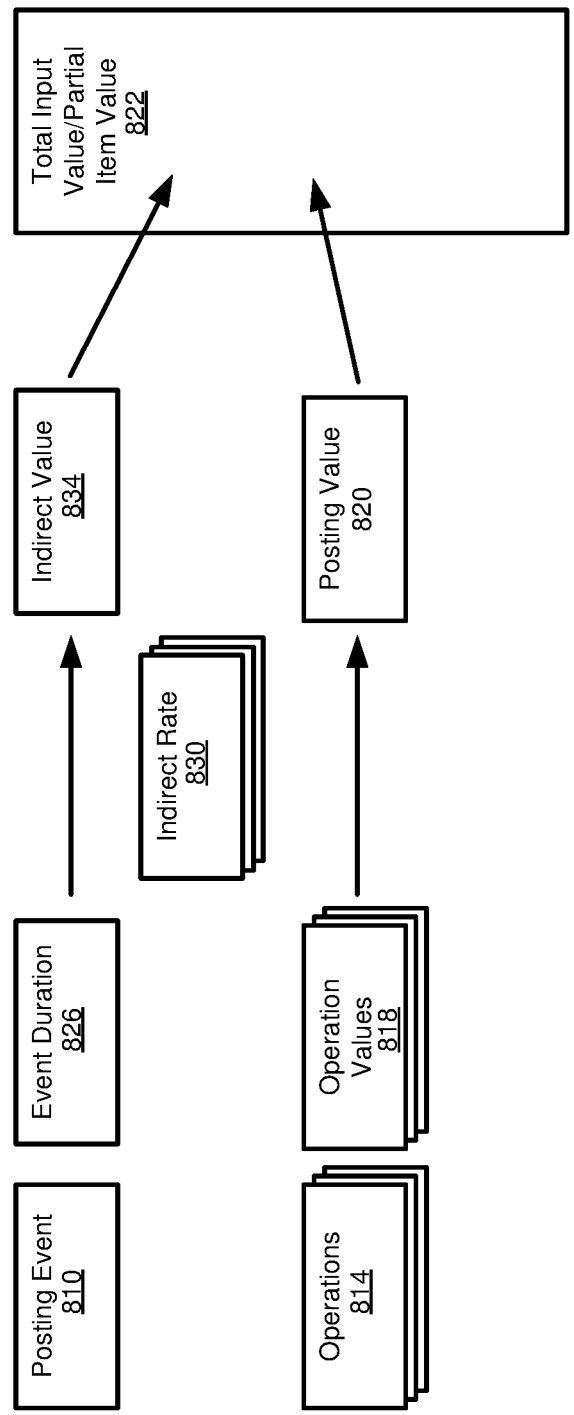
FIG. 8 is a diagram illustrating how total partial item value can be calculated in response to a posting event.

FIG. 8 illustrates how partial item values may be determined according to certain disclosed technologies. In this case, the partial item value can be defined as the value of input elements (including other partial items and, optionally, indirect input elements) used in producing the partial item. The partial item value is shown as being determined as of a posting event 810. For instance, in some cases, the illustrated process can be carried out at other times, such as in response to a query request by a user or software application. However, the determination is typically not triggered in response to particular time intervals not directly associated with a production process (e.g., time intervals that are defined for particular reporting intervals that are not tied to fulfillment of a production request or ongoing production activities).

When the posting event occurs 810, production operations 814 that have occurred as of the posting event can be calculated (or the results of previous calculations retrieved and combined with calculations using newly received data). For example, production operations 814 can be determined with reference to one or more production models (e.g., the process 300 of FIG. 3A or FIG. 3B). Each production operation 814 can be associated with actual or planned values, such as for input elements used or output items produced. The value of the input elements, adjusting for any output elements produced therefrom, can be used to determine an operation value 818. The operation values 818 are combined to provide a posting value 820 of the operations as of the posting event 810, providing a portion of a partial item value 822.

A planned or actual posting duration 826 can be determined, which can be a time period during which all or a portion of the operations 814 in reaching the posting event were carried out. The duration 826 can be applied to one or more indirect input element rates 830 to provide an indirect input value 834. In other cases, the indirect input value can be determined without using the event duration, or using factors in addition to the event duration 826. For instance, a posting event 810 can be assigned an allocation of indirect input values that is independent of the event duration.

The indirect input value 834 can provide a remaining portion of the partial item value 822. The posting event 820 value and the indirect input value 834 can provide the partial item value 822.

Figure 9:
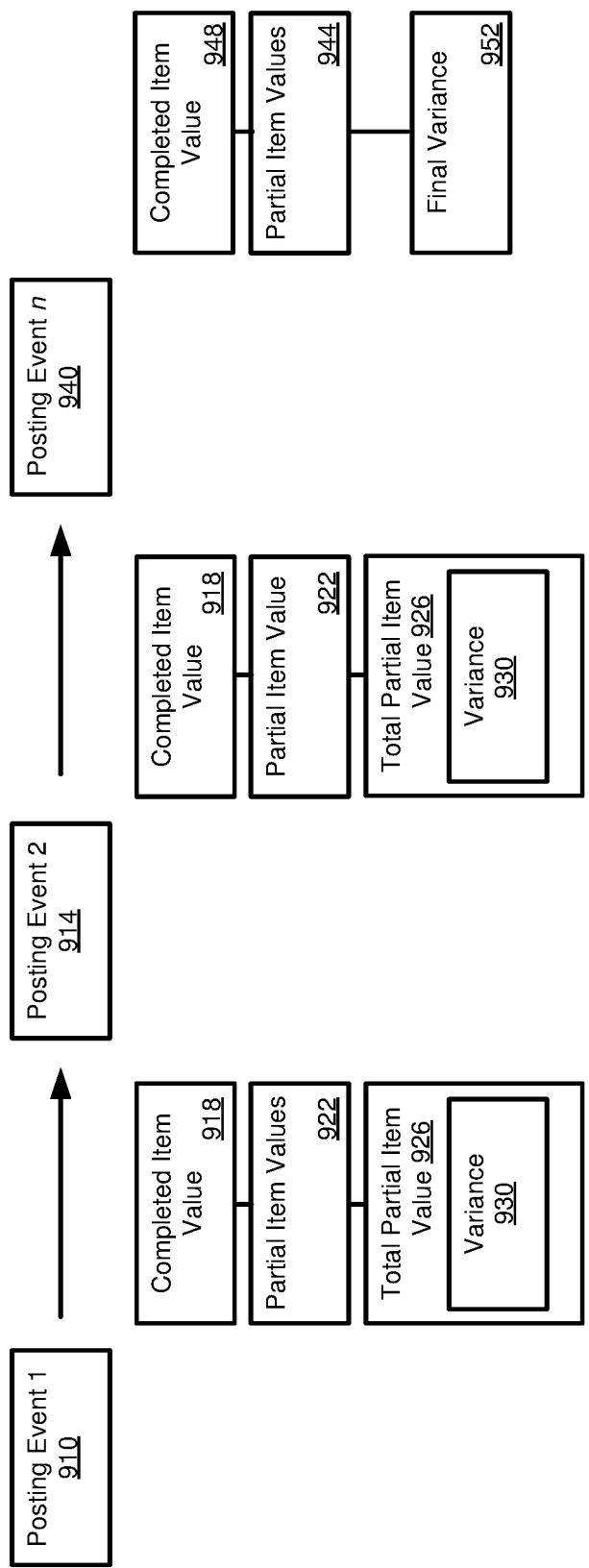
FIG. 9 is a diagram illustrating a method of calculating total partial item value and excess input element value for a production process.

Example 9—Example Operation Total Partial Item Value Calculation Including Variances FIG. 9 illustrates how, as of particular posting events (e.g., the receipt of new data from a production center), a total partial item value can be determined, according to one embodiment. Although FIG. 9 illustrates these calculations using event-based posting, in other aspects, these calculations can be carried out at other times, such as upon request by a user or software application, where the request is not part of a normal reporting schedule and not directly related to the production of items.

The production process of FIG. 9 includes n posting events, where the nth posting event represents completion of a request for items or a particular unit of operation in a recurring production process. For postings up to the nth posting, calculation occurs as shown for a first posting event 910 and a second posting event 914.

In response to a posting event 910, 914, a completed item value 918 is calculated, representing a value of items that have been produced during the period represented by the posting event. This amount 918 is subtracted from the sum of the total value 922 of partial items produced during the period represented by the posting event. The difference between the amounts 918 and 922 represents, at least in part, a total partial item value 926—that is, the value of partial items that have not been incorporated into a completed item. However, the total partial item value 926 also includes any amounts due to variances 930, including excess input elements used in production and scrap amounts. Thus, the total partial item value 926 can be higher than it should be by the amount of the variances 930.

For the nth posting event 940, the total of the partial item values 944 is subtracted from the value of completed items 948. The resulting difference can be treated as a final variance amount 952.

In addition to the potential issue, noted above, of a total partial item value 926 being too high for posting events prior to the nth event, the scenario depicted in FIG. 9 can be less desirable to use in repetitive production scenarios when there is not a clear event where a request or process is completed.

Figure 10:
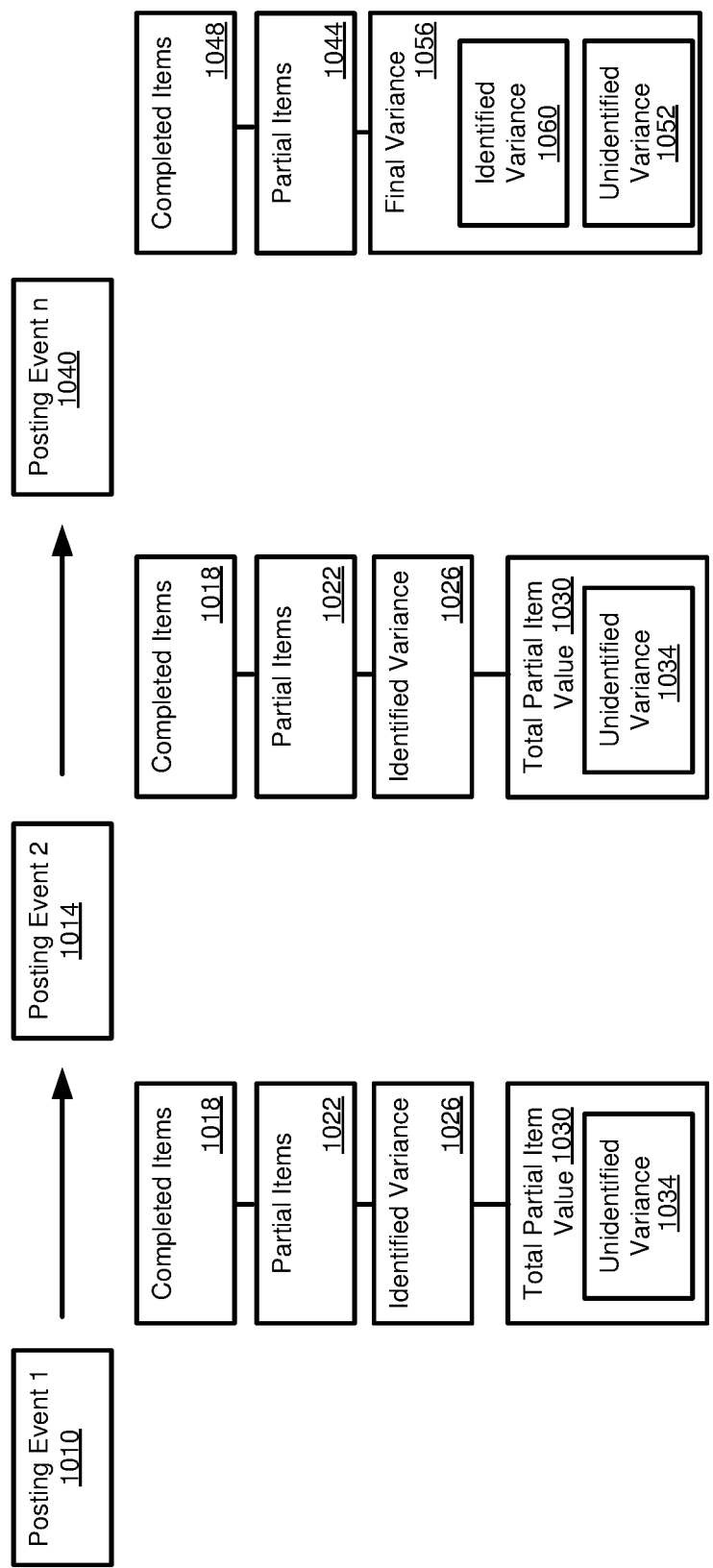
FIG. 10 is a diagram illustrating another method of calculating total partial item value and excess input element value for a production process.

Example 10—Example Operation Total Partial Value Calculation Excluding Identified Variances FIG. 10 illustrates how, as of particular posting events (e.g., the receipt of new data from a production center), a total partial item value can be determined, according to one embodiment. Although FIG. 10 illustrates these calculations using event-based posting, in other aspects, these calculations can be carried out at other times, such as upon request by a user or software application, where the request is not part of a normal reporting schedule and not directly related to the production of items.

The production process of FIG. 10 includes n posting events, where the nth posting event represents completion of a request for items or a particular unit of operations in a recurring production process. For postings up to the nth posting, calculation occurs as shown for a first posting event 1010 and a second posting event 1014.

In response to a posting event 1010, 1014, a completed item value 1018 is calculated, representing a value of items that have been produced during the period represented by (or as of) the posting event. This amount 1018 is subtracted from the sum of the total value 1022 of partial items produced during the period represented by (or as of) the posting event and any identified variances 1026. Identified variances 1026 include variances, such as scrap amounts or excess input item amounts, that are confirmed during production, such as by a data source or an operator.

The difference between the amount 1018 and the amounts 1022 and 1026 represents, at least in part, a total partial item value 1030—that is, the value of partial items that have not been incorporated into a completed item and are not identified variances 1026. The total partial item value 1030 also include any amounts due to unidentified variances 1034. While the total partial item value 1030 can be higher than it should be by the amount of unidentified variances 1034, it can be lower than the total partial item value 926 calculated according to FIG. 9.

For the nth posting event 1040, the total of the partial item values 1044 is subtracted from the value of completed items 1048. The resulting difference can be treated as a final unidentified variance amount 1052, which can be included in a final variance amount 1056 that also includes the total 1060 of any identified variances.

Example 11—Example Excess Input Item and Partial Item Value Calculation

Figure 11:
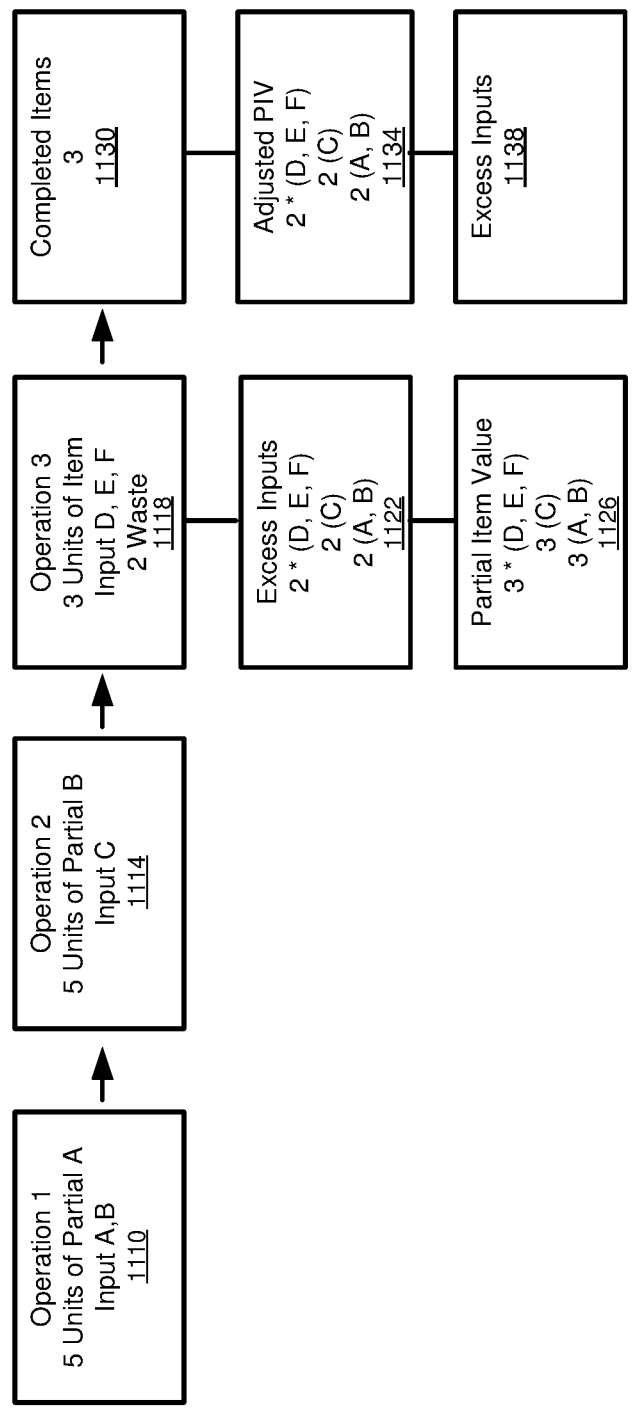
FIG. 11 is a diagram illustrating an example calculation of excess inputs and partial item value, with consideration of earlier operations.

FIG. 11 illustrates how excess input element amounts can be calculated for a multi-step production process. As illustrated in FIG. 3, a production process can involve multiple operations, and partial items, as an item is produced from initial input elements. If a problem occurs after an initial step, an item-in-process that must be discarded results in not only the specific input elements for that step being excess input elements, but also the input elements for previous steps. Or, in some cases, it may be possible to salvage or reuse some of the input elements in an operation, in which case the remaining input elements can be classified as excess input elements.

FIG. 11 illustrates a three operation process for producing an item. A first operation 1110 uses Inputs A and B and produces five units of Partial Item A. A second operation 1114 uses the five units of Partial Item A, along with Input C, to produce five units of Partial Item B. A third operation 1118 uses the five units of Partial Item A, along with Inputs D, E, F to produce 3 units of the item. If the third operation 1118 is expected to produce five units of the item, then two collections of input elements needed to produce the item may be classified as excess input items (or scrap). As shown in excess input calculation 1122, the excess inputs resulting from the two unusable items includes two each of Inputs D, E, F from the third operation 1118, two of Input C from the second operation 1114, and two each of Inputs A and B from the first operation 1112.

A partial item value 1126 be calculated as the value of input elements used in producing Partial Item 3. That is, three each of Inputs D, E, F of the third operation 1118, three of Input C of the second operation 1114, and three each of Inputs A and B of the first operation 1110.

At the end of the process of FIG. 11, a data record 1130 indicates that three items were produced. The partial item value 1132 associated with three completed items is removed from a current partial item value to provide an adjusted total partial item value 1134. In some cases, a difference between a value of the completed items 1130 and adjusted total partial item value 1134 can be classified as an excess input element value 1138 (which can reflect at least particular sources of variance, while the adjusted total partial item value 1134 may include some or all sources of variance).

Figure 12:
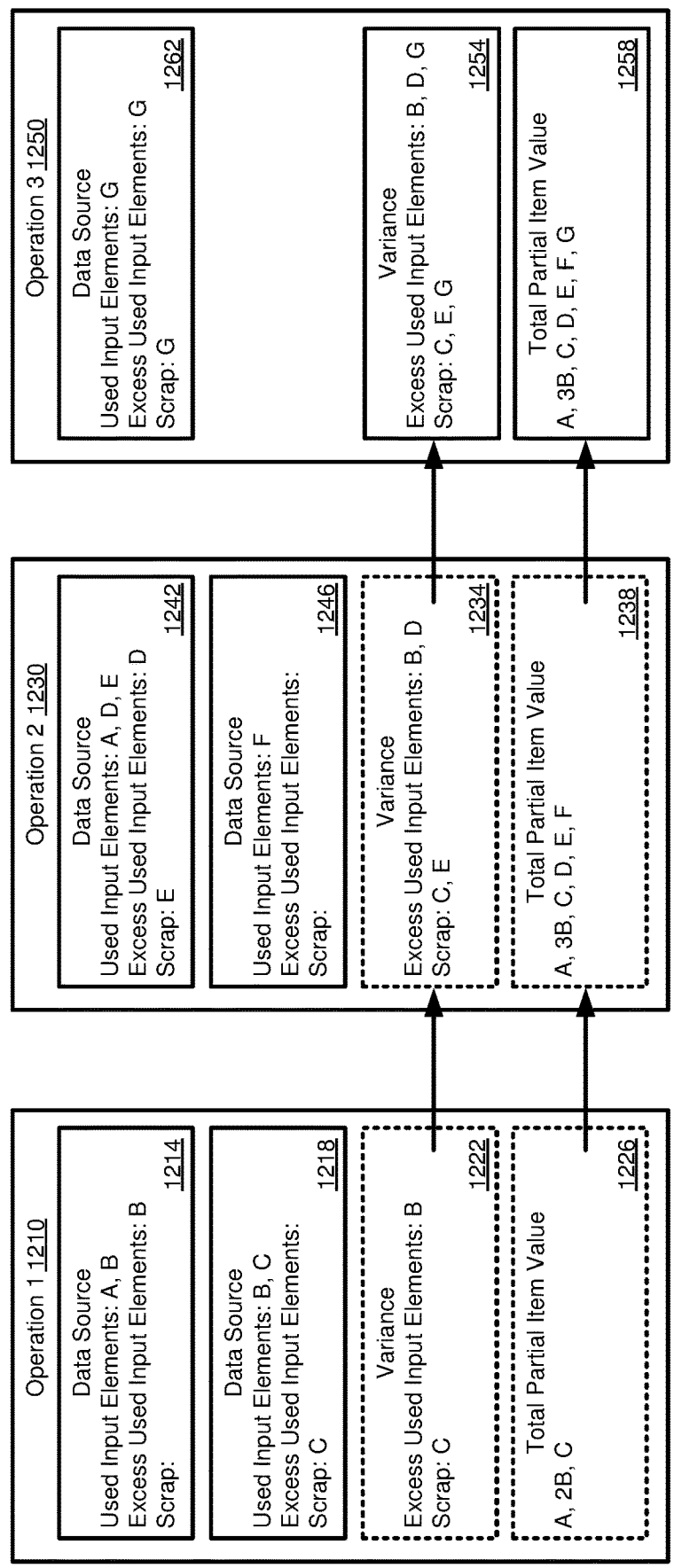
FIG. 12 is a diagram illustrating an example calculation of transferring operation values from earlier operations to later operations.

Example 12—Example Variance and Total Partial Item Value Calculation for Individual Process Operations FIG. 12 illustrates how disclosed technologies can allow for enhanced accuracy and granularity of data associated with a production process, including tracking items or partial items produced, and input elements and partial items used, for specific production operations or for specific data sources associated with specific production operations.

For instance, FIG. 12 illustrates a first operation 1210 having a data source 1214 and a data source 1218. The data source 1218 indicates that partial items were produced using one each of Input elements A and B. The data source 1214 also indicates that one excess Input element B was used, and that no scrap material was generated. The data source 1218 indicates that partial items were produced using Inputs B, C, one of Input C was assigned as scrap, and no excess input elements were used. The first operation 1210 can thus be associated with a variance 1222 of one each of Inputs B and C, which can be further classified as being excess used input elements or scrap. The first operation 1210 can also be associated with a total partial item value 1226, being the total input elements used in producing partial items in the first operation (at least as of a particular posting request or posting event).

When a second operation 1230 is initiated (or when the first operation 1210 is confirmed as completed, at least as to a particular partial item or group of partial items), the variance 1222 and total partial item value 1226 of the first operation can be transferred to a variance 1234 and a total partial item value 1238 of the second operation. In the second operation 1230, a data source 1242 uses one each of Inputs A, D, E, which are added to the total partial item value 1238. The second operation 1230 also produces a unit of Input E as scrap, and uses one excess unit of Input D, which are added to the variance 1234. Data source 1246 indicates the use of one of Input F, which is added to the total partial item value 1238, and uses no excess input items and does not produce any scrap.

When a third operation 1250 is initiated (or when the second operation 1230 is confirmed as completed, at least as to a particular partial item or group of partial items), the variance 1234 and the total partial item value 1238 of the second operation 1230 can be transferred to a variance 1254 and total partial item value 1258 of the third operation. The third operation 1250 has a data source 1262 that uses an Input G, which is added to the total partial item value 1258. The data source 1262 indicates that the third operation 1250 generates one unit of Input G as scrap and uses one unit excess of Input G, both of which are added to the variance 1254. Thus, the variance 1254 includes the variance specific to the third operation 1250, but also includes the variances 1222, 1234 of, respectively, the first operation 1210 and the second operation 1230.

Figures 13A, 13B:
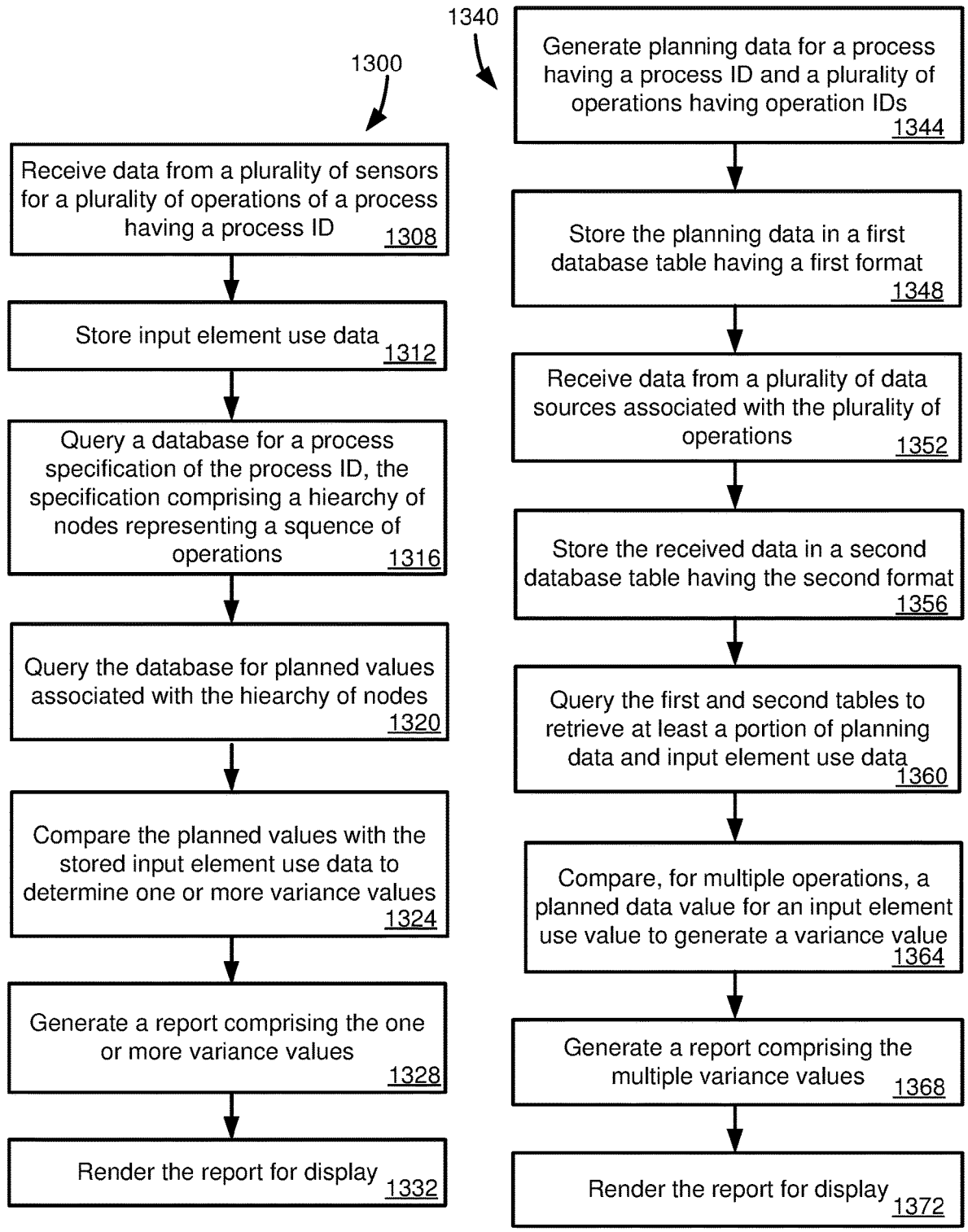
FIG. 13A is a flowchart of a method for generating a report of variance values using data received from a plurality of sensors.
FIG. 13B is a flowchart of a method for generating a report of variances values using data received from a plurality of data sources where planning and actual values are maintained in a common database table format.

Example 13—Example Operations in Real Time or Event Based Comparison of Actual and Planned Values FIG. 13A illustrates a method 1300 for generating a report of variances of planned and actual input use values using data received from a plurality of sensors. At 1308, data is received over a network from a plurality of hardware sensors associated with a plurality of operations. The data includes input element use data. The operations are associated with a process, the process having a process ID.

The input element use data is stored at 1312 in one or more database tables. At 1316, a database is queried for a process specification associated with the process ID. The process specification includes a hierarchy of nodes, where a node represents a particular operation. The hierarchy describes an operation sequence for the process having the process ID. The database is queried at 1320 for planned values associated with the hierarchy of nodes. At 1324, the planned values are compared with the stored input element use data to determine one or more variance values, where the input element use data represents actual values. A report is generated at 1328 that includes the one or more variances values between the planning values and the actual values. The report is rendered for display at 1332.

FIG. 13B illustrates a method 1340 for generating a report of variances between planned and actual input use values using data from by a plurality of data sources. At 1344, planning data is generated for a process having a process ID. The process has a plurality of operations, the operations having operation IDs. The planning data is stored in a database table having a first format at 1348. At 1352, data is received from a plurality of data sources associated with the plurality of operations of the process having the process ID. The data includes input element use data. The received data is stored at 1356 in a second database table having the first format. At 1360, the first and second database tables are queried to retrieve at least a portion of the planning data and the input element use data. For multiple operations of the plurality of operations, at 1364, planned data values for the operations are compared with input element use values to generate variance values. At 1368, a report is generated that includes the multiple variance values. The report is rendered for display at 1372.

Example 14—Computing Systems

Figure 14:
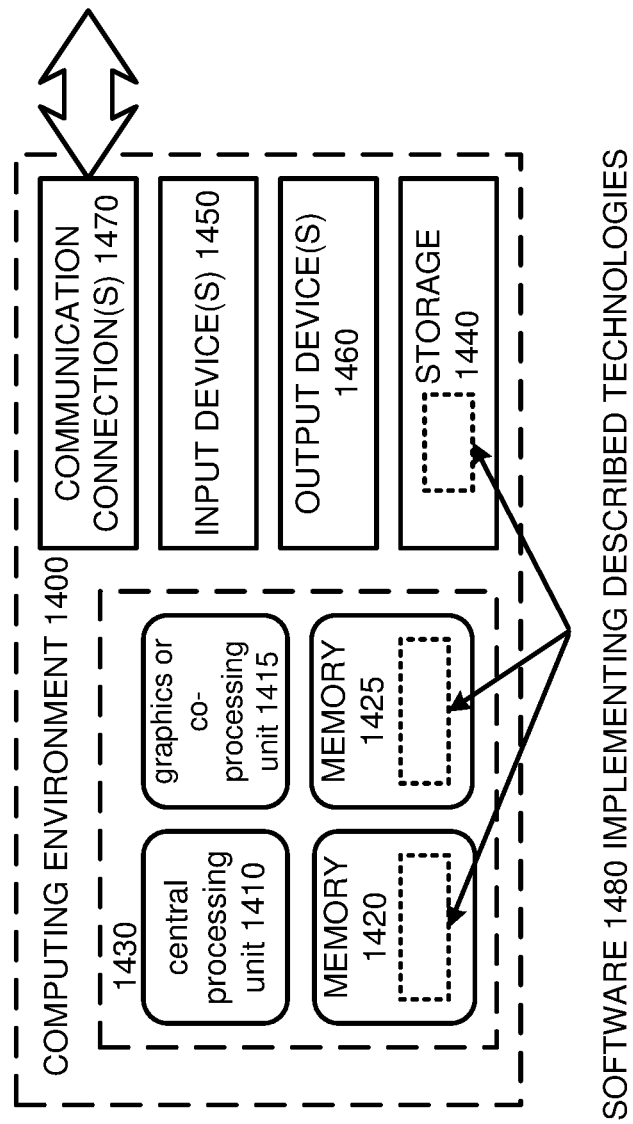
FIG. 14 is a diagram of an example computing system in which some described embodiments can be implemented.

FIG. 14 depicts a generalized example of a suitable computing system 1400 in which the described innovations may be implemented. The computing system 1400 is not intended to suggest any limitation as to scope of use or functionality of the present disclosure, as the innovations may be implemented in diverse general-purpose or special-purpose computing systems.

With reference to FIG. 14, the computing system 1400 includes one or more processing units 1410, 1415 and memory 1420, 1425. In FIG. 14, this basic configuration 1430 is included within a dashed line. The processing units 1410, 1415 execute computer-executable instructions, such as for implementing a database environment, and associated methods, described in Example 2. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 14 shows a central processing unit 1410 as well as a graphics processing unit or co-processing unit 1415. The tangible memory 1420, 1425 may be volatile memory (e.g., registers, cache, RAM), non-volatile memory (e.g., ROM, EEPROM, flash memory, etc.), or some combination of the two, accessible by the processing unit(s) 1410, 1415. The memory 1420, 1425 stores software 1480 implementing one or more innovations described herein, in the form of computer-executable instructions suitable for execution by the processing unit(s) 1410, 1415. The memory 1420, 1425, may also store database data, such as data associated with the database 208 of FIG. 2.

A computing system 1400 may have additional features. For example, the computing system 1400 includes storage 1440 (such as for storing data of the data store 222), one or more input devices 1450, one or more output devices 1460, and one or more communication connections 1470, including input devices, output devices, and communication connections for interacting with a user, such as through the user interface 262 of FIG. 2. An interconnection mechanism (not shown) such as a bus, controller, or network interconnects the components of the computing system 1400. Typically, operating system software (not shown) provides an operating environment for other software executing in the computing system 1400, and coordinates activities of the components of the computing system 1400.

The tangible storage 1440 may be removable or non-removable, and includes magnetic disks, magnetic tapes or cassettes, CD-ROMs, DVDs, or any other medium which can be used to store information in a non-transitory way and which can be accessed within the computing system 1400. The storage 1440 stores instructions for the software 1480 implementing one or more innovations described herein.

The input device(s) 1450 may be a touch input device such as a keyboard, mouse, pen, or trackball, a voice input device, a scanning device, or another device that provides input to the computing system 1400. The output device(s) 1460 may be a display, printer, speaker, CD-writer, or another device that provides output from the computing system 1400.

The communication connection(s) 1470 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 15—Cloud Computing Environment

Figure 15:
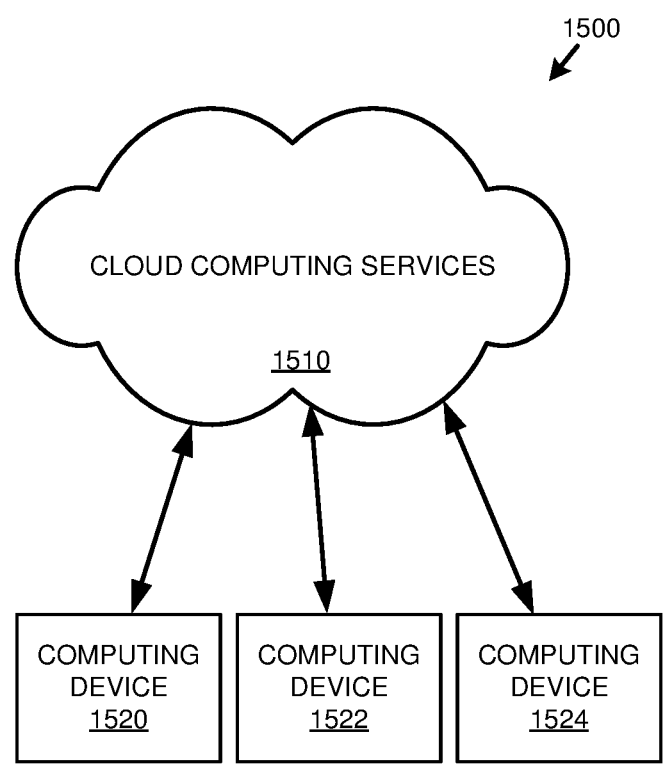
FIG. 15 is an example cloud computing environment that can be used in conjunction with the technologies described herein.

FIG. 15 depicts an example cloud computing environment 1500 in which the described technologies can be implemented. The cloud computing environment 1500 comprises cloud computing services 1510. The cloud computing services 1510 can comprise various types of cloud computing resources, such as computer servers, data storage repositories, networking resources, etc. The cloud computing services 1510 can be centrally located (e.g., provided by a data center of a business or organization) or distributed (e.g., provided by various computing resources located at different locations, such as different data centers and/or located in different cities or countries). The cloud computing services 1510 are utilized by various types of computing devices (e.g., client computing devices), such as computing devices 1520, 1522, and 1524. For example, the computing devices (e.g., 1520, 1522, and 1524) can be computers (e.g., desktop or laptop computers), mobile devices (e.g., tablet computers or smart phones), or other types of computing devices. For example, the computing devices (e.g., 1520, 1522, and 1524) can utilize the cloud computing services 1510 to perform computing operations (e.g., data processing, data storage, and the like).

Example 16—Implementations

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 14, computer-readable storage media include memory 1420 and 1425, and storage 1440. The term computer-readable storage media does not include signals and carrier waves. In addition, the term computer-readable storage media does not include communication connections (e.g., 1470).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system that implements a data processing service, the computing system comprising:
   memory;
   one or more processing units coupled to the memory; and
   one or more computer readable storage media storing computer-executable instructions that, when loaded into the memory, cause the computing system to perform operations comprising:
      receiving data over a network from a plurality of hardware sensors associated with a plurality of production process operations of a production process, the data comprising input element use data reflecting consumption of an input element by a physical machine during one or more production process operations of the plurality of production process operations, the production process having a process identifier;

storing the input element use data in a first set of one or more database tables;

querying a database, comprising the first set of one or more database tables, for a production process specification associated with the process identifier, the production process specification comprising a plurality of sequenced nodes, where a node represents a particular production process operation and a sequence position of the node within the plurality of sequenced nodes describes a production process operation sequence for the production process having the process identifier;

querying the database for calculated values associated with the plurality of sequenced nodes;

comparing the calculated values with the stored input element use data to determine one or more variance values, where the input element use data represents actual values; and displaying at least one of the one or more variance values.

2. The computing system of claim 1, wherein at least one of the first set of one or more database tables in which the input element use data is stored comprises fields representing a plurality of categories, and an addition of a value to a first field is associated with a commensurate decrease in value in a second field.

3. The computing system of claim 2, the operations further comprising:

determining planned values; and storing the planned values in a second set of one or more database tables, at least a portion of which may be included in the first set of one or more database tables and wherein the database comprises the second set of one or more database tables, at least one database table of the second set of one or more database tables comprising fields representing a plurality of categories, and a positive value in a first field is associated with a commensurate negative value in a second field.

4. The computing system of claim 1, the operations further comprising:

determining planned values; and storing the planned values in a second set of one or more database tables, at least a portion of which may be included in the first set of one or more database tables and wherein the database comprises the second set of one or more database tables, at least database table of the second set of one or more database tables comprising fields representing a plurality of categories, and a positive value in a first field is associated with a commensurate negative value in a second field.

5. The computing system of claim 1, wherein the data is received upon an occurrence of an event during execution of the production process.

6. The computing system of claim 5, wherein the data is received upon completion of a production process operation during execution of the production process.

7. The computing system of claim 6, wherein calculating one or more variance values comprises calculating a variance value for a production process operation of the plurality of production process operations.

8. The computing system of claim 1, wherein calculating one or more variance values comprises calculating a variance value for a component associated with a hardware sensor of the plurality of hardware sensors.

9. The computing system of claim 1, wherein the production process is a production process that produces an item, and one or more production process operations of the plurality of production process operations produce a partial item, the operations further comprising:

determining a value of partial items existing as of when the data is received.

10. The computing system of claim 1, wherein the calculated values are stored in the first set of one or more database tables and database tables of the first set of one or more database tables have a format, the format being the same as a format of a second set of one or more database tables in which the input element use data is stored, at least a portion of database tables of the second set of one or more database tables may be included in the first set of one or more database tables and wherein the database comprises the second set of one or more database tables.

11. The computing system of claim 1, wherein the production process specification defines one or more posting events, and data is received when a posting event has occurred.

12. The computing system of claim 1, wherein the receiving, storing, querying the database for a production process specification, querying the database for calculated values, comparing, generating, and rendering are carried out in response to a user request.

13. The computing system of claim 1, wherein the production process is associated with a request, and the receiving, storing, querying the database for a production process specification, querying the database for calculated values, comparing, generating, and rendering are carried out prior to fulfillment of the request.

14. One or more computer-readable storage media comprising:

computer-executable instructions that, when executed, cause a computing device to generate planning data for a production process having a process identifier, the production process comprising a plurality of production process operations, each production process operation having an operation identifier, wherein the planning data comprises planned input element use data reflecting planned consumption of an input element by at least one physical machine;

computer-executable instructions that, when executed, cause a computing device to store the planning data in a first database table having a first format;

computer-executable instructions that, when executed, cause a computing device to receive consumption data from a plurality of data sources associated with the plurality of production process operations of the production process having the process identifier, wherein the consumption data comprises actual input element use data reflecting actual consumption of an input element during one or more production process operations of the plurality of production process operations;

computer-executable instructions that, when executed, cause a computing device to store the consumption data in a second database table having the first format;

computer-executable instructions that, when executed, cause a computing device to query the first and second database tables to retrieve at least a portion of the planning data and the consumption data;

computer-executable instructions that, when executed, cause a computing device to, for multiple production process operations of the plurality of production process operations, compare a planned input element use value for a given production process operation of the plurality of production process operations with an actual input element use value for the given production process operation to generate a variance value;

computer-executable instructions that, when executed, cause a computing device to generate a report comprising multiple variance values; and computer-executable instructions that, when executed, cause a computing device to render the report for display.

15. The one or more computer-readable storage media of claim 14, wherein the consumption data is received upon the occurrence of an event during execution of the production process.

16. The one or more computer-readable storage media of claim 15, wherein the event comprises the completion of a production process operation of the plurality of production process operations.

17. In a computing environment, a method comprising:

receiving data over a network from a plurality of hardware sensors associated with a plurality of production process operations of a production process having a process identifier, the data comprising input element use data reflecting consumption of an input element by one or more physical machines during one or more production process operations of the plurality of production process operations;

storing the data in one or more database tables;

querying a database comprising the one or more database tables for a production process specification associated with the process identifier, the production process specification comprising a plurality of sequenced nodes, where a node represents a particular production process operation and a sequence position of the node within the plurality of sequenced nodes describes a production process operation sequence for the production process having the process identifier;

querying the database for planning values associated with the plurality of sequenced nodes;

comparing the planning values with the data to determine one or more variance values; and generating a report comprising the one or more variance values.

18. The method of claim 17, further comprising:

retrieving a production process specification associated with the process identifier, the production process specification defining one or more reporting events;

determining that a reporting event has occurred; and sending the data over the network in response to determining that the reporting event occurred.

19. The method of claim 18, wherein the determining that a reporting event has occurred is based at least in part on data received from a hardware sensor.

20. The method of claim 18, wherein the determining that a reporting event has occurred comprises receiving user input confirming that the reporting event has occurred.

* * * * *